United States Patent
Stark et al.

(10) Patent No.: US 10,776,190 B2
(45) Date of Patent: Sep. 15, 2020

(54) HARDWARE APPARATUSES AND METHODS FOR MEMORY CORRUPTION DETECTION

(71) Applicant: Intel Corporation, Santa Clara, CA (US)

(72) Inventors: Tomer Stark, Nesher (IL); Ron Gabor, Hertzliya (IL); Joseph Nuzman, Haifa (IL); Raanan Sade, Kibutz Gvat (IL); Bryant E. Bigbee, Scottsdale, AZ (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/224,579

(22) Filed: Dec. 18, 2018

(65) Prior Publication Data

US 2019/0235948 A1 Aug. 1, 2019

Related U.S. Application Data

(63) Continuation of application No. 14/977,354, filed on Dec. 21, 2015, now Pat. No. 10,162,694.

(51) Int. Cl.
*G06F 11/00* (2006.01)
*G06F 11/07* (2006.01)
(Continued)

(52) U.S. Cl.
CPC ............ *G06F 11/0751* (2013.01); *G06F 9/38* (2013.01); *G06F 11/073* (2013.01); *G06F 12/00* (2013.01);
(Continued)

(58) Field of Classification Search
CPC .... G06F 11/073; G06F 11/10; G06F 11/0772; G06F 11/20; G06F 11/1072; G11C 11/56;
(Continued)

(56) References Cited

U.S. PATENT DOCUMENTS 3,916,385 A   10/1975  Parmar et al.
4,809,160 A    2/1989  Mahon et al.
(Continued)

FOREIGN PATENT DOCUMENTS

EP  0428079 A2   5/1991
JP  H03244054 A  10/1991
(Continued)

OTHER PUBLICATIONS

Extended European Search Report for Application No. 16879720.7, dated Jul. 8, 2019, 6 pages.
(Continued)

*Primary Examiner* — Bryce P Bonzo
*Assistant Examiner* — Jeison C Arcos
(74) *Attorney, Agent, or Firm* — Nicholson De Vos Webster & Elliott LLP

(57) ABSTRACT

Methods and apparatuses relating to memory corruption detection are described. In one embodiment, a hardware processor includes an execution unit to execute an instruction to request access to a block of a memory through a pointer to the block of the memory, and a memory management unit to allow access to the block of the memory when a memory corruption detection value in the pointer is validated with a memory corruption detection value in the memory for the block, wherein a position of the memory corruption detection value in the pointer is selectable between a first location and a second, different location.

24 Claims, 19 Drawing Sheets

(51) Int. Cl.
*G06F 12/00* (2006.01)
*G06F 9/38* (2018.01)
*G06F 12/109* (2016.01)
*G06F 21/60* (2013.01)
*G06F 12/14* (2006.01)

(52) U.S. Cl.
CPC .......... *G06F 12/109* (2013.01); *G06F 21/60* (2013.01); *G06F 12/145* (2013.01); *G06F 2212/1032* (2013.01); *G06F 2212/1052* (2013.01); *G06F 2212/656* (2013.01)

(58) Field of Classification Search
CPC .............. G11C 11/5621; G11C 13/004; G11C 13/0069
See application file for complete search history.

(56) References Cited

U.S. PATENT DOCUMENTS

| | | |
|---|---|---|
| 4,821,169 A | 4/1989 | Sites et al. |
| 5,325,496 A * | 6/1994 | Hays .................. G06F 11/362 711/200 |
| 6,009,503 A | 12/1999 | Liedtke |
| 6,048,940 A | 4/2000 | Blaedel et al. |
| 6,671,699 B1 | 12/2003 | Black et al. |
| 6,694,450 B1 | 2/2004 | Kidder et al. |
| 6,823,433 B1 | 11/2004 | Barnes et al. |
| 7,401,234 B2 | 7/2008 | Case et al. |
| 8,554,984 B2 | 10/2013 | Yano et al. |
| 8,595,442 B1 | 11/2013 | James-Roxby et al. |
| 9,026,866 B2 | 5/2015 | Balasubramanian |
| 9,390,031 B2 | 7/2016 | Durham et al. |
| 9,652,375 B2 | 5/2017 | Stark et al. |
| 2004/0031030 A1 | 2/2004 | Kidder et al. |
| 2004/0158775 A1 | 8/2004 | Shibuya et al. |
| 2005/0193217 A1 | 9/2005 | Case et al. |
| 2006/0187941 A1 | 8/2006 | Andersen |
| 2006/0256877 A1 | 11/2006 | Szczepanek et al. |
| 2006/0256878 A1 | 11/2006 | Szczepanek et al. |
| 2007/0055837 A1 | 3/2007 | Rajagopal et al. |
| 2008/0209282 A1 | 8/2008 | Lee et al. |
| 2009/0271536 A1 | 10/2009 | Tiennot |
| 2009/0292977 A1 | 11/2009 | Bradley et al. |
| 2010/0162038 A1 | 6/2010 | Hulbert et al. |
| 2011/0078389 A1 | 3/2011 | Patel et al. |
| 2013/0013843 A1 | 1/2013 | Radovic et al. |
| 2013/0318322 A1 | 11/2013 | Shetty et al. |
| 2013/0326288 A1 | 12/2013 | Datta et al. |
| 2014/0020092 A1 | 1/2014 | Davidov |
| 2014/0115283 A1 | 4/2014 | Radovic et al. |
| 2014/0281354 A1 | 9/2014 | Tkacik et al. |
| 2014/0372698 A1 | 12/2014 | Lee et al. |
| 2015/0278103 A1 | 10/2015 | Radovic et al. |
| 2016/0048378 A1 | 2/2016 | Varma |
| 2016/0124802 A1 | 5/2016 | Gabor et al. |
| 2016/0259582 A1* | 9/2016 | Howell ................. G06F 3/0659 |
| 2016/0259682 A1 | 9/2016 | Stark et al. |
| 2016/0283300 A1 | 9/2016 | Stark et al. |
| 2016/0371139 A1 | 12/2016 | Stark et al. |

FOREIGN PATENT DOCUMENTS

| | | |
|---|---|---|
| WO | 2007079011 A2 | 7/2007 |
| WO | 2007079011 A3 | 11/2007 |

OTHER PUBLICATIONS

Advisory Action from U.S. Appl. No. 11/323,446, dated Apr. 17, 2012, 3 pages.
Duarte G., et al., "Memory Translation and Segmentation," Aug. 12, 2008, downloaded from http://duartes.org/gustavo/blog/post/memory-translation-and-segmentation/ on Jun. 25, 2017, 7 pages.
Final Office Action from U.S. Appl. No. 11/323,446, dated Dec. 30, 2011, 18 pages.
Final Office Action from U.S. Appl. No. 11/323,446, dated Jan. 17, 2013, 17 pages.
Final Office Action from U.S. Appl. No. 11/323,446, dated Jul. 7, 2009, 21 pages.
Final Office Action from U.S. Appl. No. 11/323,446, dated Jul. 16, 2015, 17 pages.
Final Office Action from U.S. Appl. No. 11/323,446, dated Jul. 28, 2014, 16 pages.
Final Office Action from U.S. Appl. No. 11/323,446, dated Oct. 15, 2010, 17 pages.
Final Office Action from U.S. Appl. No. 11/323,446, dated Sep. 20, 2013, 14 pages.
Final Office Action from U.S. Appl. No. 14/977,354, dated Mar. 8, 2018, 18 pages.
First Office Action from foreign counterpart China Patent Application No. 200680049912.1, dated Jun. 10, 2010, 4 Pages of Chinese Office Action, and 7 Pages of English Translation.
Gove D., et al., "Detecting memory access errors," Nov. 25, 2015, 17 pages.
International Preliminary Report on Patentability for Application No. PCT/US2006/048940, dated Jul. 1, 2008, 8 pages.
International Preliminary Report on Patentability for Application No. PCT/US2016/063211, dated Jul. 5, 2018, 10 pages.
International Search Report and Written Opinion for Application No. PCT/US2006/048940, dated Sep. 25, 2007, 15 pages.
International Search Report and Written Opinion for Application No. PCT/US2016/063211, dated Mar. 7, 2017, 11 pages.
Introduction to SPARC M7 and Silicon Secured Memory (SSM), Retrieved from https://swisdev.oracle.com/_files/What-Is-SSM.html on Jul. 4, 2016, 2 pages.
Mahon M.J., et al., "Hewlett-Packard Precision Architecture: The Processor," Hewlett-Packard Journal, Aug. 1986, 19 pages.
Min R., et al., "Improving Performance of Large Physically Indexed Caches by Decoupling Memory Addresses From Cache Addresses," IEEE Transactions on Computers, vol. 50, No. 11, Nov. 2001, pp. 1191-1201.
Non-Final Office Action from U.S. Appl. No. 11/323,446, dated Apr. 23, 2010, 16 pages.
Non-Final Office Action from U.S. Appl. No. 11/323,446, dated Jan. 15, 2015, 18 pages.
Non-Final Office Action from U.S. Appl. No. 11/323,446, dated Jun. 7, 2013, 18 pages.
Non-Final Office Action from U.S. Appl. No. 11/323,446, dated Jun. 22, 2012, 16 pages.
Non-Final Office Action from U.S. Appl. No. 11/323,446, dated Mar. 15, 2011, 16 pages.
Non-Final Office Action from U.S. Appl. No. 11/323,446, dated Mar. 20, 2014, 15 pages.
Non-Final Office Action from U.S. Appl. No. 11/323,446, dated Nov. 5, 2015, 5 pages.
Non-Final Office Action from U.S. Appl. No. 11/323,446, dated Oct. 7, 2008, 17 pages.
Non-Final Office Action from U.S. Appl. No. 14/977,354, dated Jul. 21, 2017, 15 pages.
Notice of Allowance from U.S. Appl. No. 11/323,446, dated Mar. 14, 2016, 5 pages.
Notice of Allowance from U.S. Appl. No. 14/977,354, dated Sep. 6, 2018, 7 pages.
Notice of Final Rejection from foreign counterpart Korean Patent Application No. 10-2008-7015716, dated Dec. 31, 2010, 3 Pages of Korean Office Action, and 3 Pages of English Translation.
Notice of Preliminary Rejection from foreign counterpart Korean Patent Application No. 10-2008-7015716, dated Apr. 20, 2010, 5 Pages of Korean Office Action, and 5 Pages of English Translation.
Notice of Reasons for rejection from foreign counterpart Japan Patent Application No. 2008-541443, dated Jun. 15, 2010, 2 Pages of Japanese Office Action, and 2 Pages of English Translation.
Office Action from foreign counterpart Korean Patent Application No. 10-2008-7015716, dated Jul. 27, 2012, 10 Pages of Korean Office Action, and 4 Pages of English Translation.

(56) References Cited

OTHER PUBLICATIONS

Rajadurai A., "SPARC M7 Chip—32 cores—Mind Blowing performance," Oracle Angelo's Soapbox Blog, Aug. 15, 2014, downloaded from https://blogs.oracle.com/rajadurai/sparc-m7-chip-32-cores-mind-blowing-performance-v2 on Aug., 10, 2017, 7 pages.
Wilkes J., et al., "A Comparison of Protection Lookaside Buffers and the PA-RISC Protection Architecture," Mar. 1992, Hewlett-Packard, 12 pages.
Office Action, TW App. No. 105137679, dated Jun. 10, 2020, 7 pages (4 pages of English Translation and 3 pages of Original Document).

\* cited by examiner

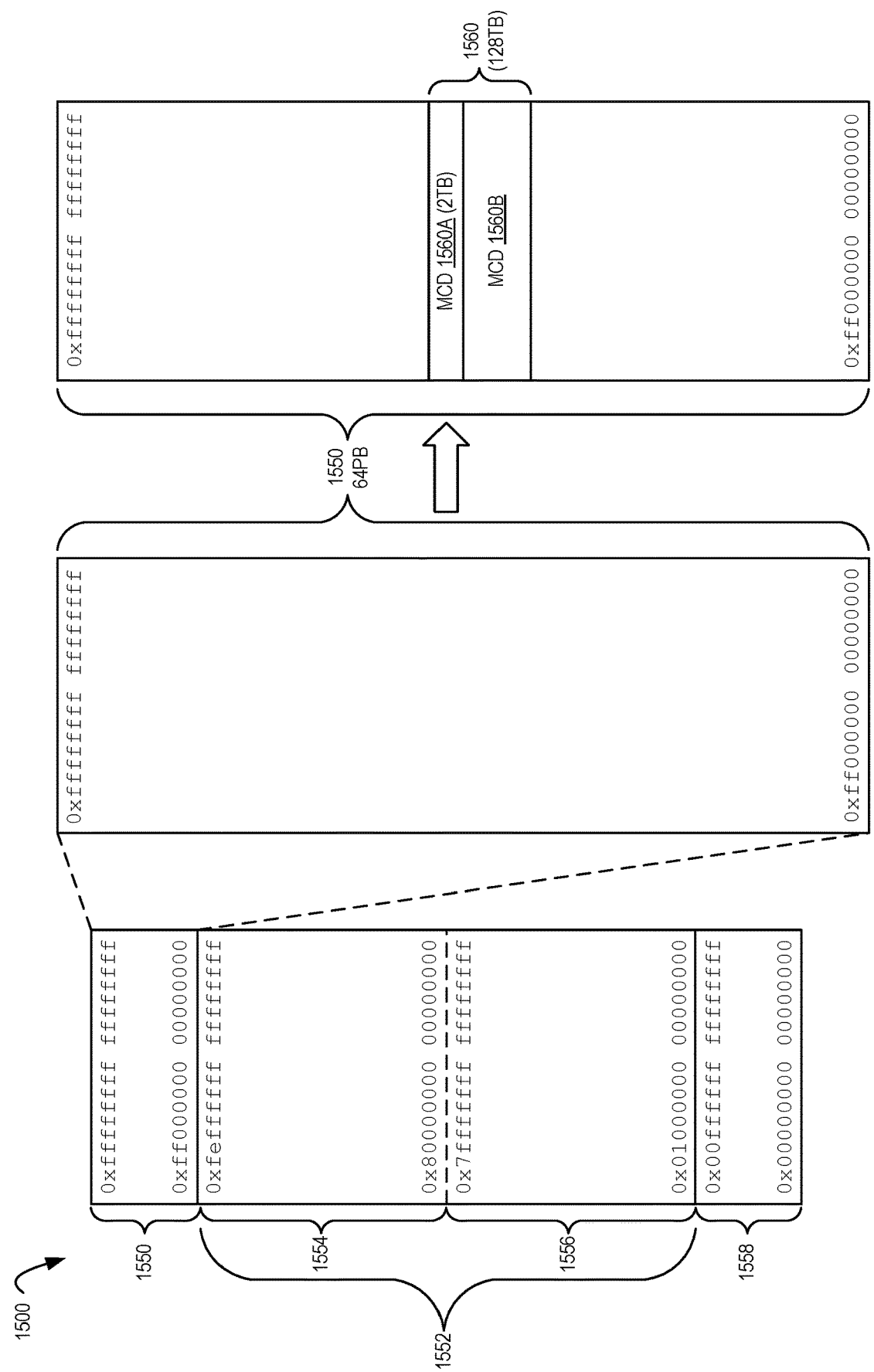

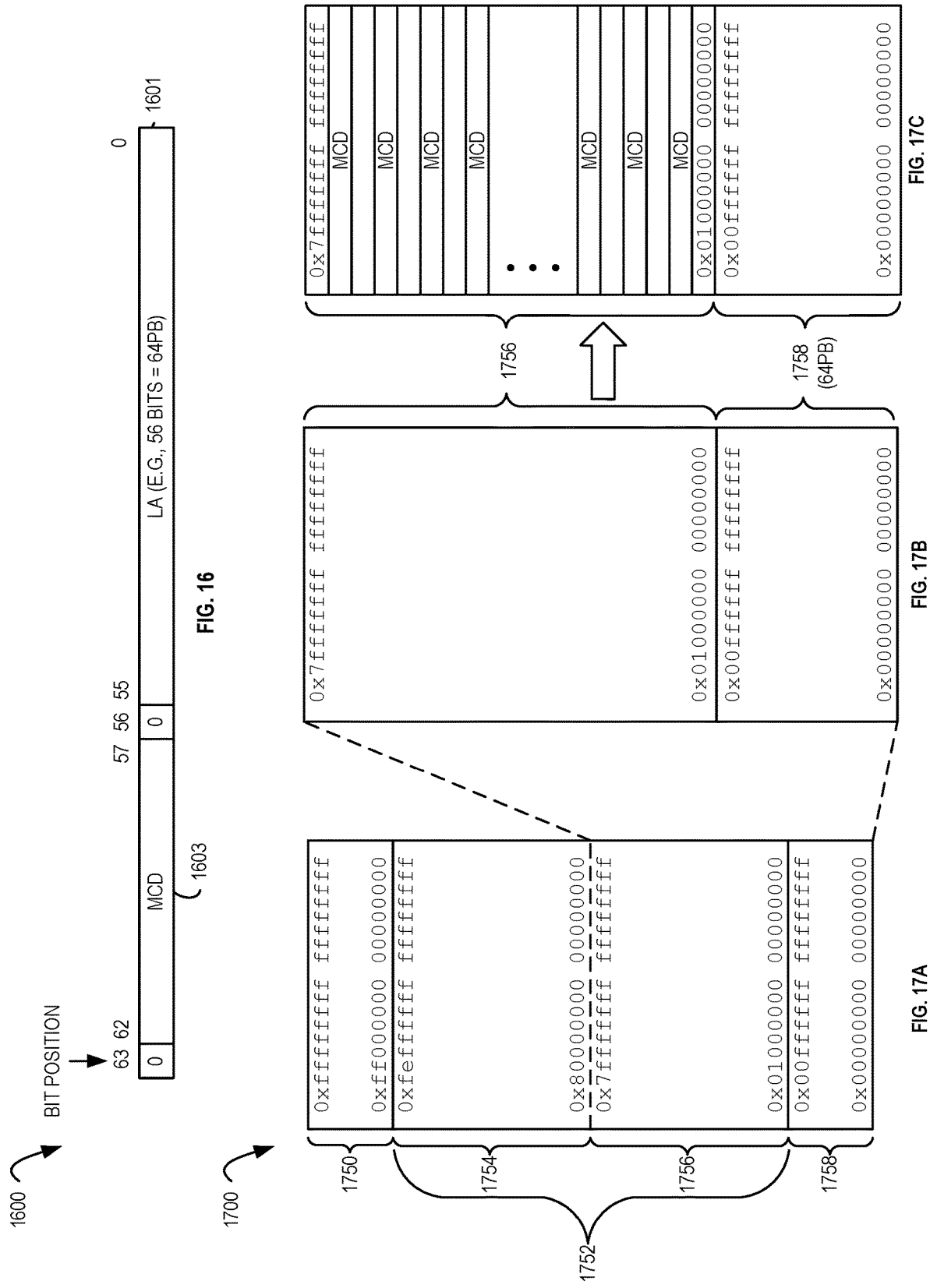

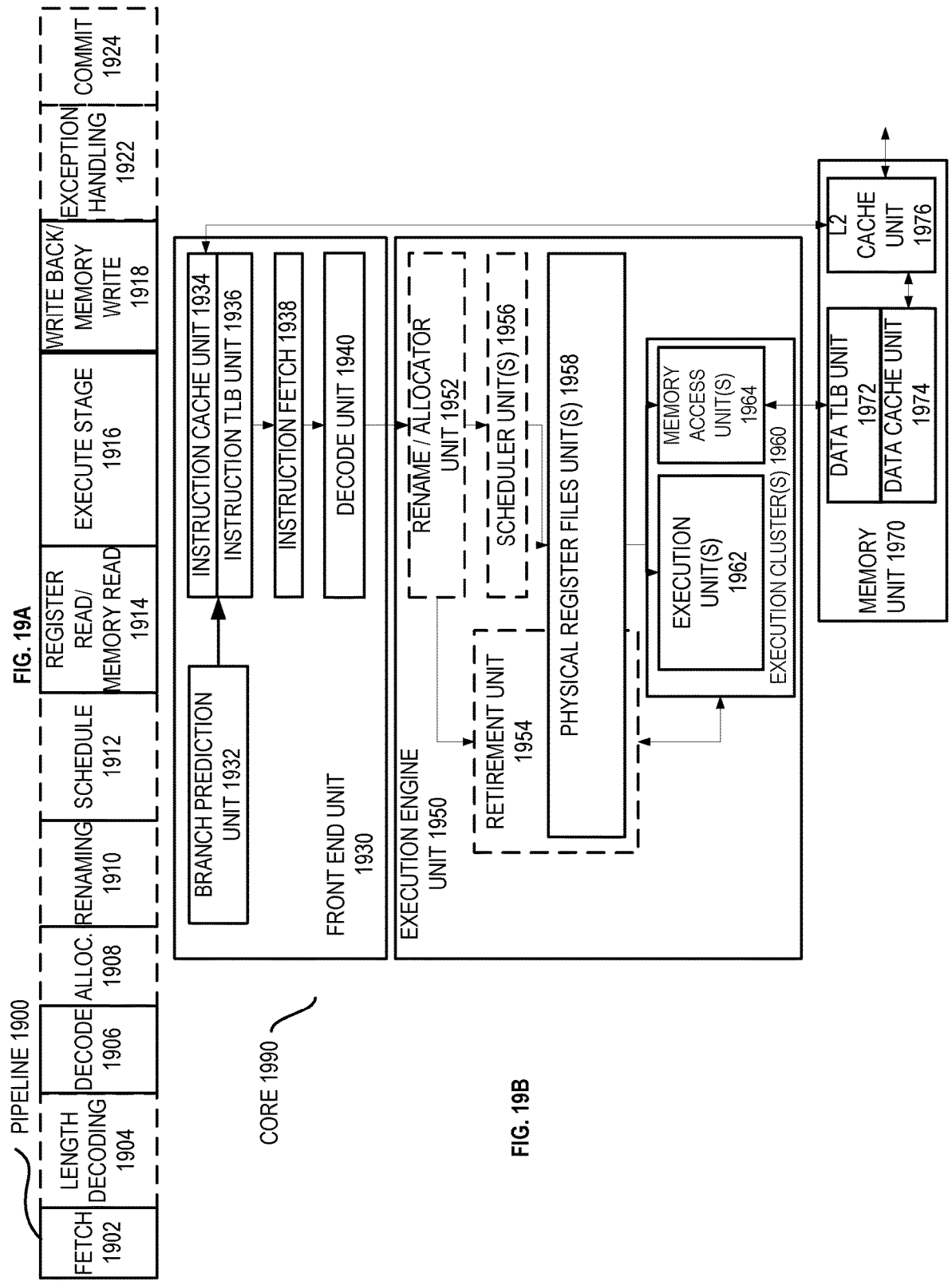

HARDWARE APPARATUSES AND METHODS FOR MEMORY CORRUPTION DETECTION

CROSS REFERENCE TO RELATED APPLICATIONS

The present patent application is a continuation application claiming priority from U.S. patent application Ser. No. 14/977,354, filed Dec. 21, 2015, and titled: "Hardware Apparatuses and Methods for Memory Corruption Detection", which is incorporated herein by reference in its entirety.

TECHNICAL FIELD

The disclosure relates generally to electronics, and, more specifically, an embodiment of the disclosure relates to a hardware processor with memory corruption detection hardware.

BACKGROUND

A processor, or set of processors, executes instructions from an instruction set, e.g., the instruction set architecture (ISA). The instruction set is the part of the computer architecture related to programming, and generally includes the native data types, instructions, register architecture, addressing modes, memory architecture, interrupt and exception handling, and external input and output (I/O). It should be noted that the term instruction herein may refer to a macro-instruction, e.g., an instruction that is provided to the processor for execution, or to a micro-instruction, e.g., an instruction that results from a processor's decoder decoding macroinstructions.

BRIEF DESCRIPTION OF THE DRAWINGS

The present disclosure is illustrated by way of example and not limitation in the figures of the accompanying drawings, in which like references indicate similar elements and in which:

FIG. 15A illustrates a linear address space according to embodiments of the disclosure.

FIG. 15B illustrates a view of a portion of the linear address space in FIG. 15A according to embodiments of the disclosure.

FIG. 15C illustrates a view of the portion of the linear address space in FIG. 12B with a subset of memory corruption detection (MCD) protected space according to embodiments of the disclosure.

FIG. 16 illustrates a pointer format with an address field, a memory corruption detection (MCD) space field, and a memory corruption detection (MCD) value field according to embodiments of the disclosure.

FIG. 17A illustrates a linear address space according to embodiments of the disclosure.

FIG. 17B illustrates a view of a portion of the linear address space in FIG. 17A according to embodiments of the disclosure.

FIG. 17C illustrates a view of the portion of the linear address space in FIG. 17B with a subset of memory corruption detection (MCD) protected space according to embodiments of the disclosure.

FIG. 19A is a block diagram illustrating both an exemplary in-order pipeline and an exemplary register renaming, out-of-order issue/execution pipeline according to embodiments of the disclosure.

FIG. 19B is a block diagram illustrating both an exemplary embodiment of an in-order architecture core and an exemplary register renaming, out-of-order issue/execution architecture core to be included in a processor according to embodiments of the disclosure.

DETAILED DESCRIPTION

In the following description, numerous specific details are set forth. However, it is understood that embodiments of the disclosure may be practiced without these specific details. In other instances, well-known circuits, structures and techniques have not been shown in detail in order not to obscure the understanding of this description.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

A (e.g., hardware) processor (e.g., having one or more cores) may execute instructions to operate on data, for example, to perform arithmetic, logic, or other functions. A hardware processor may access data in a memory (e.g., a data storage device). In one embodiment, a hardware processor is a client requesting access to (e.g., load or store) data and the memory is a server containing the data. In one embodiment, a computer includes a hardware processor requesting access to (e.g., load or store) data and the memory is local to the computer. Memory may be divided into separate lines (e.g., one or more cache lines) of data, for example, that may be managed as a unit for coherence purposes. In certain embodiments, a (e.g., data) pointer (e.g., an address) is a value that refers to (e.g., points) the location of data, for example, a pointer may be an (e.g., linear) address and the data may be stored at that (e.g., linear) address. In certain embodiments, memory may be divided into multiple lines and each line may be have its own (e.g., unique) address. For example, a line of memory may include storage for 512 bits, 256 bits, 128 bits, 64 bits, 32 bits, 16 bits, or 8 bits of data.

In certain embodiments, memory corruption (e.g., by an attacker) may be caused by an out-of-bound access (e.g., memory access using the base address of a block of memory and an offset that exceeds the allocated size of the block) or by a dangling pointer (e.g., a pointer which referenced a block of memory (e.g., buffer) that has been de-allocated).

Certain embodiments herein may utilize memory corruption detection (MCD) hardware and/or methods, for example, to prevent an out-of-bound access or an access with a dangling pointer.

Figure 1:
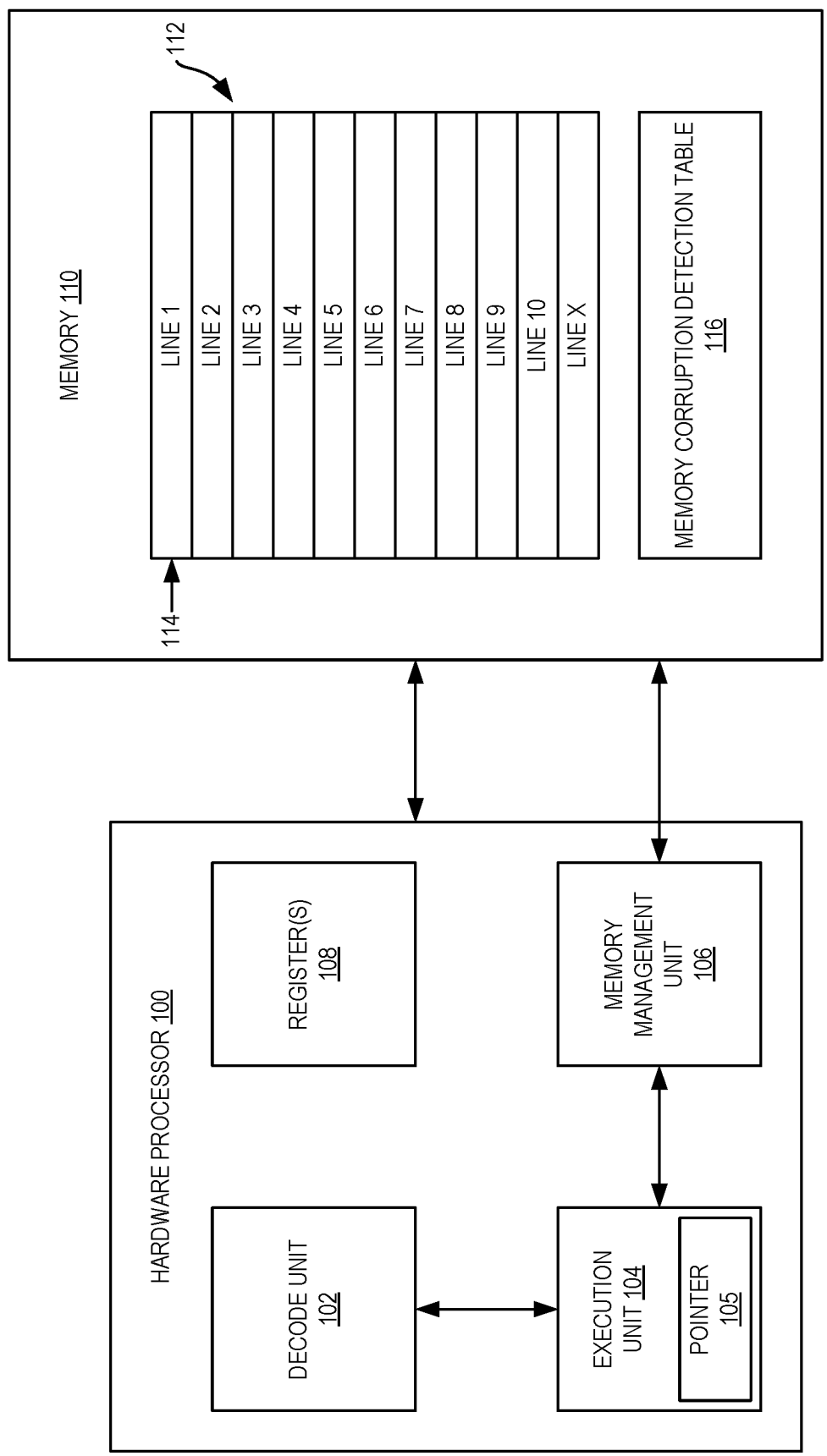
FIG. 1 illustrates a hardware processor according to embodiments of the disclosure.

Turning now to the figures, FIG. 1 illustrates a hardware processor 100 according to embodiments of the disclosure. Depicted hardware processor 100 includes a hardware decode unit 102 to decode an instruction, e.g., an instruction that is to request access to a block of a memory 110 through a pointer 105 to the block of the memory 110. Pointer 105 may be an operand of the instruction. Depicted hardware execution unit 104 is to execute the decoded instruction, e.g., the decoded instruction that is to request access to the block of the memory 110 through a pointer 105 (e.g., having a value of the (e.g., linear) address 114) to the block of the memory 110. In one embodiment, a block of data is a single line of data. In one embodiment, a block of data is multiple lines of data. For example, a block of memory may be lines 1 and 2 of data of the (e.g., linear or physical) addressable memory 112 of memory 110 that includes a pointer 105 (e.g., having a value of the address 114) to one (e.g., the first) line (e.g., line 1). Certain embodiments may have a memory of a total size of X number of lines.

Hardware processor 100 may include one or more register 108, for example, control register or configuration registers, such as, but not limited to, model specific register (MSR) or other registers. In one embodiment, a value stored in a control register is to change (e.g., control) selectable features, for example, features of the hardware processor.

Hardware processor 100 includes a coupling (e.g., connection) to a memory 110. Memory 110 may be a memory local to the hardware processor (e.g., system memory). Memory 110 may be a memory separate from the hardware processor, for example, memory of a server. Note that the figures herein may not depict all data communication connections. One of ordinary skill in the art will appreciate that this is to not obscure certain details in the figures. Note that a double headed arrow in the figures may not require two-way communication, for example, it may indicate one-way communication (e.g., to or from that component or device). Any or all combinations of communications paths may be utilized in certain embodiments herein.

Hardware processor 100 includes a memory management unit 106, for example, to perform and/or control access (e.g., by the execution unit 104) to the (e.g., addressable memory 112 of) memory 110. In one embodiment, hardware processor includes a connection to the memory. Additionally or alternatively, memory management unit 106 may include a connection to the (e.g., addressable memory 112 and/or memory corruption detection table 116 of) memory 110.

Certain embodiments may include memory corruption detection (MCD) features, for example, in a memory management unit. Certain embodiments may utilize a memory corruption detection (MCD) value in each pointer and a corresponding (e.g., matching) MCD value saved in the memory for the memory being pointed to, for example, saved as metadata (e.g., data that describes other data) for each block of data being pointed to by the pointer. A MCD value may be a sequence of bits, for example, a 2, 3, 4, 5, 6, 7, 8, 9, 10, 11, 12, 13, 14, 15, 16 bits, etc. In one embodiment, a memory corruption detection (MCD) hardware processing system or processor (e.g., a memory management unit of the processor or system) is to validate pointers produced by instructions of the applications being executed by the processing system or processor that request access to the memory.

Certain embodiments herein (e.g., of settings of an MMU circuit) utilize one of more of the following attributes for memory corruption detection: MCD enabled (e.g., to turn the MCD feature on or off), MCD position (e.g., to define the bit position(s) of MCD values (metadata) in pointers), MCD protected space, for example, a prefix in the most significant bit positions of the pointer (e.g., to define the linear address range that is to be protected by the architecture), and MCD directory base (e.g., to point to the memory MCD value (e.g., metadata) table (e.g., directory)).

Certain embodiments herein allow the flexible placement of MCD values (e.g., metadata bits) into a pointer, e.g., not limited to the most significant bits. Certain embodiments herein allow for carving out a smaller address space (e.g., reduction in linear address space overhead) and/or for scaling for (e.g., 64 bit) paging modes. Certain embodiments herein allow protection with MCD for only a subset (e.g., part of) memory through a protected space selection (e.g., selecting the address(es) to protect with MCD and not protecting the other addresses with MCD).

In FIG. 1, memory management unit 106 (e.g., hardware memory management unit) of hardware processor 100 may receive a request to access (e.g., load or store) memory 110 (e.g., addressable memory 112). The request may include a pointer 105 (e.g., having a value of address 114), for example, passed in as an operand (e.g., direct or indirect) of an instruction. Pointer may include as a portion (e.g., field) thereof a memory corruption detection (MCD) value. A multiple line block of memory may include an MCD value for that block, e.g., a same MCD value for all of the lines in that block, and the MCD value for that block is to correspond to (e.g., match) the MCD value inside the pointer to that block. Memory management unit 106 (e.g., a circuit thereof) may perform an MCD validation check (e.g., to allow or deny access) according to this disclosure.

Figure 2:
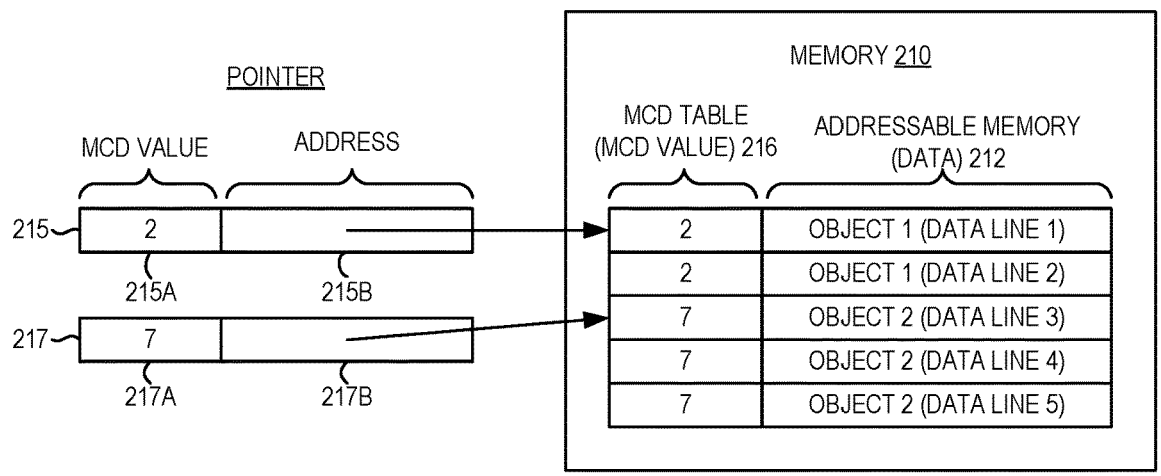
FIG. 2 illustrates memory corruption detection (MCD) according to embodiments of the disclosure.

FIG. 2 illustrates memory corruption detection (MCD) according to embodiments of the disclosure. A processing system or processor may maintain a metadata table (e.g., MCD table 116 or MCD table 216) that stores an MCD value (e.g., MCD identifier) for each line of a plurality of lines of a memory block, for example, lines of a pre-defined size (e.g., 64 bytes, although other line sizes may be utilized). In one embodiment, when a block of memory is allocated to a (e.g., newly created) memory object, a unique MCD value is generated and associated with the one or more lines of that block. The MCD value may be stored in one or more (e.g., metadata) table entries that correspond to the memory block being allocated for the (e.g., newly created) memory object. In FIG. 2, data lines 1 and 2 are depicted as allocated to object 1 (e.g., as a block of data) and an MCD value (shown here as "2") is associated in MCD table 216, for example, such that each data line is associated with an entry in the MCD table 216 that indicates the MCD value (e.g., "2") for that block. In FIG. 2, data lines 3-5 are depicted as allocated to object 2 (e.g., as a block of data) and an MCD value (shown here as "7") is associated in MCD table 216, for example, such that each data line is associated with an entry in the MCD table 216 that indicates the MCD value (e.g., "7") for that block. In one embodiment, the MCD table 216 has an MCD value field for each corresponding line of the addressable memory 112.

In certain embodiments, the generated MCD value, or a different value that corresponds or maps to the generated MCD value for the block of data, is stored in one or more bits of a pointer, e.g., a pointer that is returned by the memory allocation routine to the application that requested the memory allocation. In FIG. 2, pointer 215 includes an MCD value field 215A with the MCD value ("2") and address field 215B with a value for the (e.g., linear) address of (e.g., the first line of) the object 1 block of memory. In FIG. 2, pointer 217 includes an MCD value field 217A with the MCD value ("7") and address field 217B with a value for the (e.g., linear) address of (e.g., the first line of) the object 2 block of memory.

In certain embodiments, responsive to receiving a memory access instruction (e.g., as determined from an opcode of the instruction or an attempt to access memory), the processing system or processor compares the MCD value retrieved from the MCD table (e.g., for the block of data to be accessed) to the MCD value from (e.g., extracted from) the pointer specified by the memory access instruction. In one embodiment, when the two MCD values match, the access to the block of data is granted. In one embodiment, when the two MCD values mismatch, access to the block of data is denied, e.g., a page fault may be generated. In one embodiment, the MCD table (e.g., MCD table 116 or MCD table 216) is in the linear address space of the memory. In one embodiment, the circuit and/or logic to perform the MCD validation check (e.g., in memory management unit (MMU) 106) is to access the memory but the other portions of the processor (e.g., the execution unit) are to not access the memory unless the MCD validation check passes (e.g., a match is true). In one embodiment, a request for access to a block of memory is a load instruction. In one embodiment, a request for access to a block of memory is a store instruction.

In FIG. 2, a request to access the object 1 block in addressable memory 212 of memory 210 may initiate (e.g., by a memory management unit) reading the pointer 215 for the MCD value ("2") in MCD value field 215A and the (e.g., linear) address in address field 215B. The system (e.g., processor) may then perform a validation check, for example, by loading the MCD value from the MCD table 216 in memory 210 for the line or lines to be accessed and comparing that to the MCD value in the pointer 215 to those line or lines. In certain embodiments, if the system determines that the MCD values match (e.g., both being "2" in this example), then the system allows (e.g., read and/or write) access to the memory (e.g., only data lines 1 or 1 and 2). In certain embodiments, if there is no match, the request is denied (e.g., the requesting instruction may fault). In one embodiment, the request to access the object 1 block may include a request to access all lines in the object (data lines 1 and 2), and the system may perform a validation check on data line 1 (e.g., as discussed above) and may perform a second validation check on data line 2. For example, the system (e.g., processor) may perform a validation check on line 2 by loading the MCD value from the MCD table 216 in memory 210 for line 2 (e.g., MCD value "2") and comparing that to the MCD value in the pointer 215. In certain embodiments, if the system determines that the MCD values match (e.g., both MCD values being "2" in this example), then the system allows (e.g., read and/or write) access to the memory (e.g., data line 2).

Figure 3:
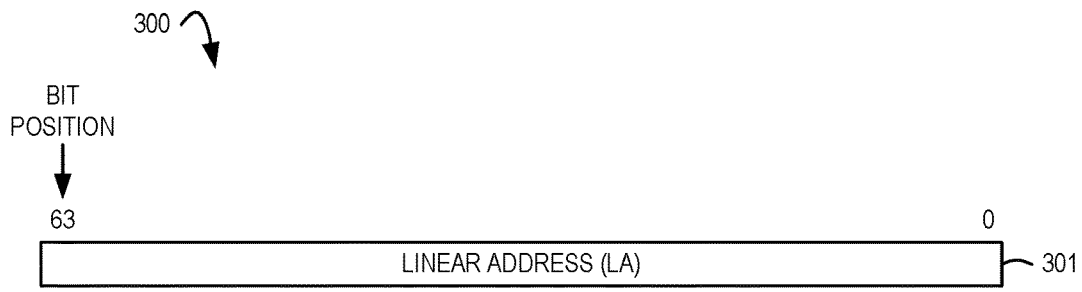
FIG. 3 illustrates a pointer format with an address field and without a memory corruption detection (MCD) value field according to embodiments of the disclosure.

FIG. 3 illustrates a pointer format 300 with an address field 301 and without a memory corruption detection (MCD) value field according to embodiments of the disclosure. In one embodiment, an address field 301 contains a linear address of the data line storing the data to be accessed. The illustrated bit positions are examples. The pointer size of 64 bits is an example.

Figure 4:
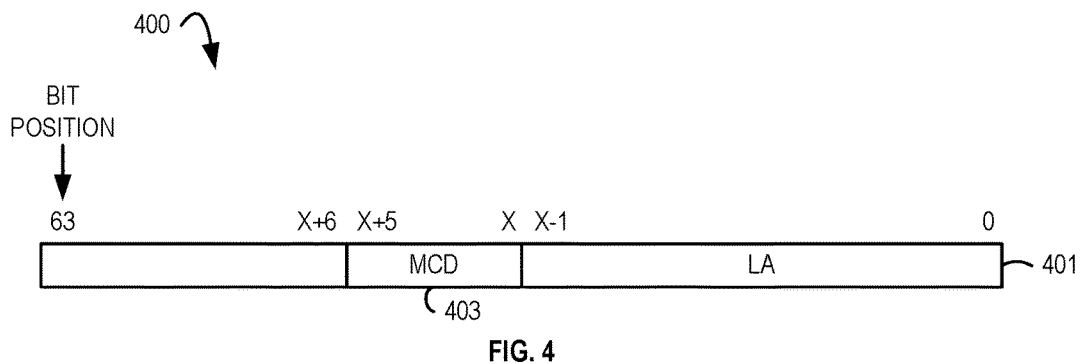
FIG. 4 illustrates a pointer format with an address field and a memory corruption detection (MCD) value field according to embodiments of the disclosure.

FIG. 4 illustrates a pointer format 400 with an address field 401 and a memory corruption detection (MCD) value field 403 according to embodiments of the disclosure. In one embodiment, MCD value field 403 is to store the MCD value for the pointer, e.g., where the MCD value and the address for the pointer are returned by the memory allocation routine to the application that requested the memory allocation. MCD value field 403 may be located at any position (e.g., location) in the pointer, e.g., it is not fixed in one position. MCD value field 403 may have a size of 1, 2, 3, 4, 5, 6, 7, 8, 9, 10 bits, etc. In one embodiment, the MCD value field is not in the 1, 2, 3, 4, 5, 6, 7, 8, 9, 10, etc. most significant bits or least significant bits of the pointer. In one embodiment, the position of the memory corruption detection value in the pointer is selectable between a first location and a second, different location. In one embodiment, the position of the memory corruption detection value in the pointer is selectable between a first location, a second, different location, and a third, different location. In one embodiment, the position of the memory corruption detection value in the pointer is selectable between a first location, a second, different location, a third different location, and fourth, different location, etc. In one embodiment, a plurality of different locations includes one or more bit positions that do not overlap. In one embodiment, a plurality of different locations includes one or more bit positions that overlap.

Figure 5:
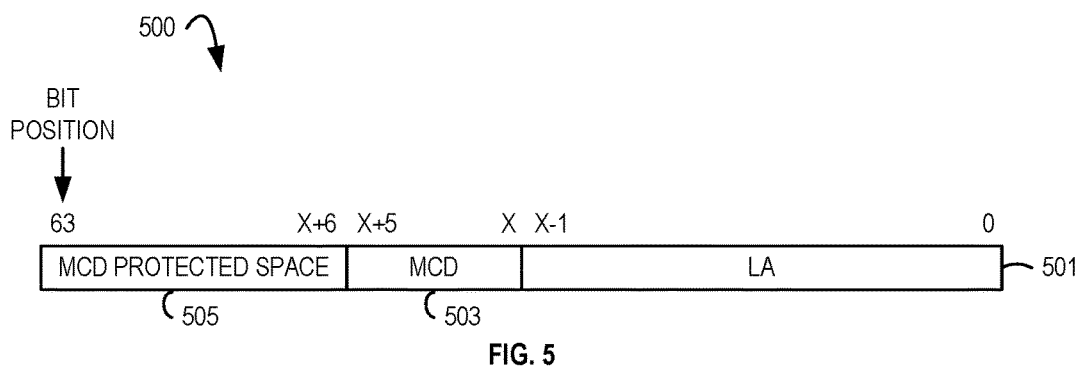
FIG. 5 illustrates a pointer format with an address field, a memory corruption detection (MCD) space field, and a memory corruption detection (MCD) value field according to embodiments of the disclosure.

FIG. 5 illustrates a pointer format 500 with an address field 501, a memory corruption detection (MCD) protected space field 505, and a memory corruption detection (MCD) value field 503 according to embodiments of the disclosure. In one embodiment, address field 501 is a linear address of the data line storing the data to be accessed. In one embodiment, MCD value field 503 is to store the MCD value for the pointer. In one embodiment, MCD protected space field 505 stores a value to indicate if the pointer is to a region of the memory that is to have a MCD validation check performed.

In one embodiment, the position of the memory corruption detection value in each pointer is selectable, for example, at manufacture, at set-up, or by an application (e.g., software, such as, but not limited to, an operating system), e.g., during activation of an MCD feature. The position may be set in the hardware processor, e.g., by writing to a control (or configuration) register. In one embodiment, the MCD protected space (e.g., which subset(s) of the memory is protected by the MCD features) is selectable, for example, at manufacture, at set-up, or by an application (e.g., software, such as, but not limited to, an operating system), e.g., during activation of an MCD feature. The protected space (e.g., less than all of the (addressable) memory) may be set in the hardware processor, e.g., by writing to a control (or configuration) register. In one embodiment, MCD hardware and methods, for example, via an ISA interface, allows the definition of one of more of the following, e.g., by software (e.g. OS): (1) the position of the MCD value (e.g., metadata) in the pointer, e.g., which bits out of the linear address in the pointer are used to store the MCD value, (2) the MCD protected space (e.g., range) to define the subset of memory (e.g., addresses) that is to go through memory corruption detection (e.g., and the address lines in memory that will have an MCD value), for example, the MCD protected space may be the linear address bits prefix that defines the protected region or memory range that is to go through memory corruption detection (e.g., and contains MCD value), and (3) a pointer (e.g., linear address pointer) to the base of the memory MCD (e.g., metadata) table(s). In one embodiment, multiple subsets (e.g., regions) of memory may be protected by MCD, for example, by having multiple attributes sets including the information above. In one embodiment, these attributes may be implemented (e.g., set) through a register (e.g., a control and/or configuration register).

In one embodiment, the following psuedocode in Table 1 below may be used to check if a linear address in a pointer is part of an MCD protected space (e.g., such that MCD validation check is to be performed).

TABLE 1

LA_Prefix = LA[63:(MCD.Position+6)]
If (MCD.Enabled && MCD.Prefix == LA_Prefix)
   MCD Check LA against MCD.MemoryMetadataTable In one embodiment, there are multiple regions (e.g., [i] with a different index i for each region) and each region to be protected by MCD may be defined by one or more of: MCD[i].Enabled, MCD[i].Position, MCD[i].ProtectedSpace (e.g., MCD[i].Prefix), and MCD[i].BaseAddressOfMCDTable. In one embodiment, an (e.g., arbitrary) order for MCD protected space may be as in the following psuedocode in Table 2 for N protected regions.

TABLE 2

For i=1 to N
  LA_Prefix = LA[63:(MCD[i].Position+6)]
  If (MCD[i].Enabled && MCD[i].Prefix == LA_Prefix)
    MCD Check against MCD[i].MemoryMetadataTable
    Break As noted above, the MCD value being 6 bits wide is merely an example and other sizes may be utilized.

Figure 6:
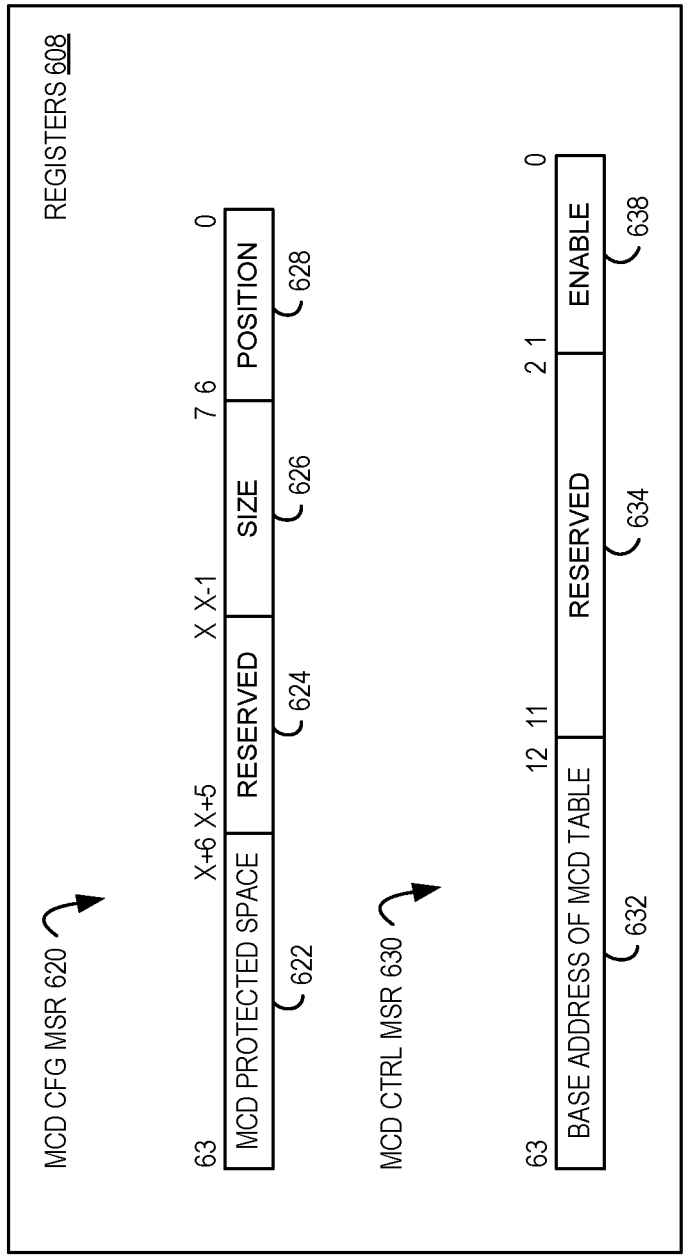
FIG. 6 illustrates data formats of registers for memory corruption detection (MCD) according to embodiments of the disclosure.

FIG. 6 illustrates data formats of registers 608 for memory corruption detection (MCD) according to embodiments of the disclosure. Although two register are depicted, one or more registers may be utilized. In one embodiment, a control or configuration register may be a model specific register (MSR). MCD configuration register (CFG MSR) 620 may include one or more of the following: a memory corruption detection (MCD) protected space field 622 (e.g., to set which subset of memory is to be protected by the MCD hardware and/or methods disclosed herein), size field 626 (e.g., to set the size (for example, number of bit positions) that an MCD value in the pointer and/or in an MCD table will include), and position field 628 (e.g., to set which bits in the pointer are to be used as the MCD value, for example, the first bit position or last bit position of the MCD value. In one embodiment, one or more fields (e.g., reserved field 624) may not be used for MCD. MCD control register (CTRL MSR) 630 may include one or more of the following: base address of an MCD table field 632 (e.g., where a base address plus an offset (for example, an offset from the address of the line(s) from the pointer) indicates a MCD value for a corresponding line in memory) and an enable field 638 (e.g., MCD checking is enabled when set (e.g., to 1)). In one embodiment, one or more fields (e.g., reserved field 634) are not used for MCD. In one embodiment, a reserved field (e.g., reserved field 624 and/or reserved field 634) is used to define different modes for the behavior of MCD validation. Although the bit positions (e.g., sizes) are listed, these are example embodiments and other bit positions (e.g., sizes) may be used in certain embodiments, for example, and may also be fixed (e.g., constant and not configurable) in some embodiments. In one embodiment, one or more of the above fields may be included in a single register or each field may be in its own register.

A write (e.g., store instruction) to a register may set one or more of the fields, e.g., a write from software to enable and/or set-up MCD protection. A plurality of sets of MCD configuration and/or control registers may be utilized, for example, MCD CFG MSR [i] and MCD CTRL MSR [i], e.g., where i may be any positive integer. In one embodiment, a different value of i exists for each subset (e.g., region) of memory to be protected by MCD, for example, wherein each subset (e.g., region) may have a different MCD table (e.g., and thus base address) and/or different size, position, protected space, combinations thereof, etc.

Figure 7:
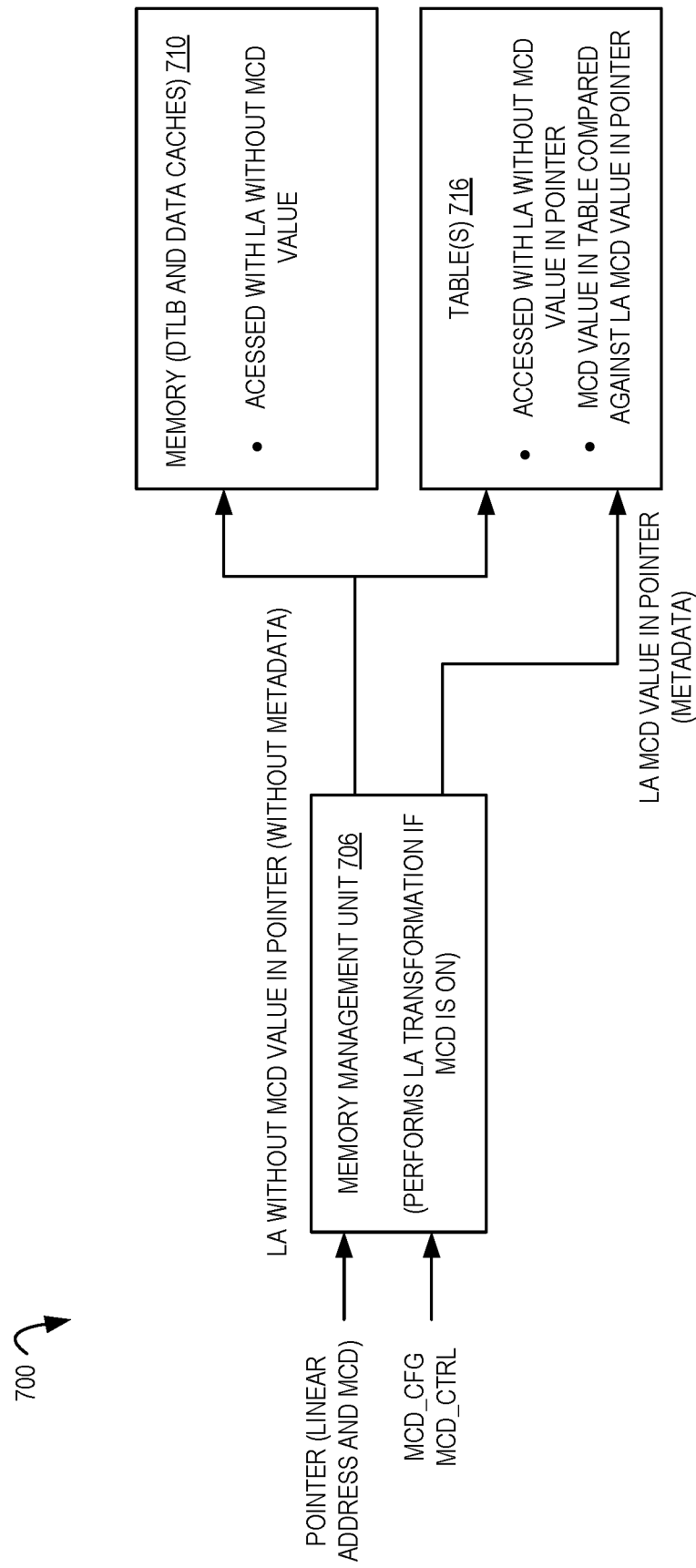
FIG. 7 illustrates a memory corruption detection (MCD) system with a memory management unit according to embodiments of the disclosure.

FIG. 7 illustrates a memory corruption detection (MCD) system 700 with a memory management unit 706 according to embodiments of the disclosure. In the depicted embodiment, memory management unit 706 (e.g., memory management circuit) is to receive the features that will be enabled (e.g., from a configuration and/or control register), for example, the position of the MCD value in a pointer and/or the location of the MCD table for the lines in memory. In the depicted embodiment, memory management unit 706 is to receive a pointer (e.g., for a memory access request). In one embodiment, the memory management unit 706 may perform a linear address translation on the address value from the pointer to determine the linear address of the line of memory pointed to by the pointer. In one embodiment, the memory management unit 706 removes a MCD value in the pointer from the linear address. In one embodiment, the memory management unit inserts a value into the removed MCD value bit positions. For example, all the removed bits from the removed MCD value may be replaced by all zeros or all ones, e.g., matching the value of the most significant bit (e.g., bit position 63) of the pointer. The linear address without the MCD value may be utilized to obtain (e.g., from the MCD table 716) the associated MCD value for the line of memory 710. The MCD value in the pointer may then be compared to the MCD value in the table for that line being pointed to for a determination if there is a match (e.g., by the memory management unit 706). In certain embodiments, if the MCD values match, the data request is fulfilled. In certain embodiments, if MCD values do not match, the data request is denied.

Figure 8:
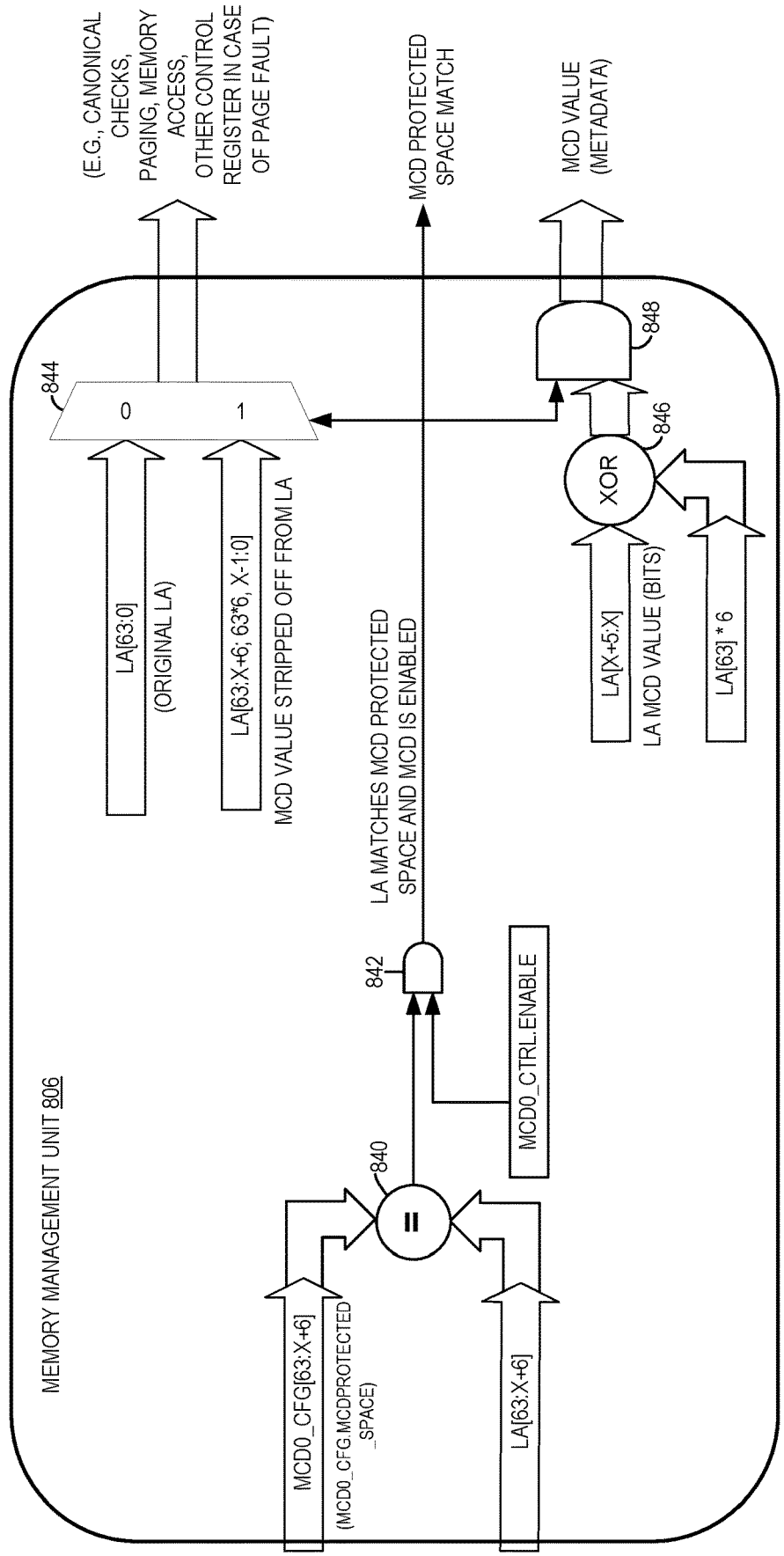
FIG. 8 illustrates a memory management unit according to embodiments of the disclosure.

FIG. 8 illustrates a memory management unit 806 according to embodiments of the disclosure. In the depicted circuit in FIG. 8, hardware comparator 840 is to compare the MCD protected space value (e.g., with the example being bit positions 63:(X+6) of the configuration register (e.g., CFG MSR 620 in FIG. 6)) with the same bit positions (e.g., 63:(X+6)) of the pointer (e.g., the linear address prefix value in the MCD protected space field in the pointer in FIG. 5). In the depicted embodiment, if the output of the comparator is true (e.g., 1 in binary) and the MCD enable bit is enabled (e.g., enable field 638 in CTRL MSR 630 in FIG. 6 is set to 1 in binary), the logical AND gate 842 may output a signal (e.g., 1 in binary). The 1 therefrom may be the control signal to multiplexer 844 and thus cause an output of the pointer (e.g., the linear address) with the MCD value of the pointer removed therefrom. In the depicted embodiment, each of the removed MCD value bits are replaced by the value in the most significant bit position (bit position 63) of the pointer. A zero as a control signal to the multiplexer 844 may cause an output of the original pointer (e.g., for a non MCD protected region). A 1 output from the logical AND gate 842 may cause the logical AND gate 848 to output the results of the logical exclusive OR (XOR) gate 846 on the MCD value from the pointer (e.g., (X+5):X) and the number of bits in the MCD value in the pointer times the bit value from bit 63. In one embodiment, this is to output the MCD value. In one embodiment for canonical pointers (e.g., pointers where all of the canonical bits are identical), the XOR gate 846 is to output an MCD value of 0. In an embodiment in reference to FIG. 16, the MCD value field is stored in some of the canonical bits (62:57) and without MCD, all of those bits are to be 0 and with MCD, if those bits are 0 it means the MCD value is 0. In one embodiment in reference to FIG. 16, where bit 63 is a 1 without MCD, all of those bits are to be canonical (e.g., bits 63:56=1) and with MCD, if bits 62:57 are 1, then XORing them with bit 63 will also result with an MCD value of 0. In one embodiment, this causes all canonical pointers to have an MCD value of 0, e.g., which may be beneficial in software implementations. A zero to logical AND gate 848 is to cause an output of zero. A 1 from the logical AND gate 842 may be output as a signal that the input pointer is pointing to a line of memory that is in an MCD protected space. A 0 from the logical AND gate 842 may be output as a signal that the input pointer is pointing to a line of memory that is not in an MCD protected space. Note that 6 is an example bit size of the MCD value and other sizes may be used.

The following discusses examples of the number of lines that a pointer of a certain size may uniquely identify, e.g., a 57 bit linear address may allow unique pointers to 128 petabytes (PB).

Figure 9:
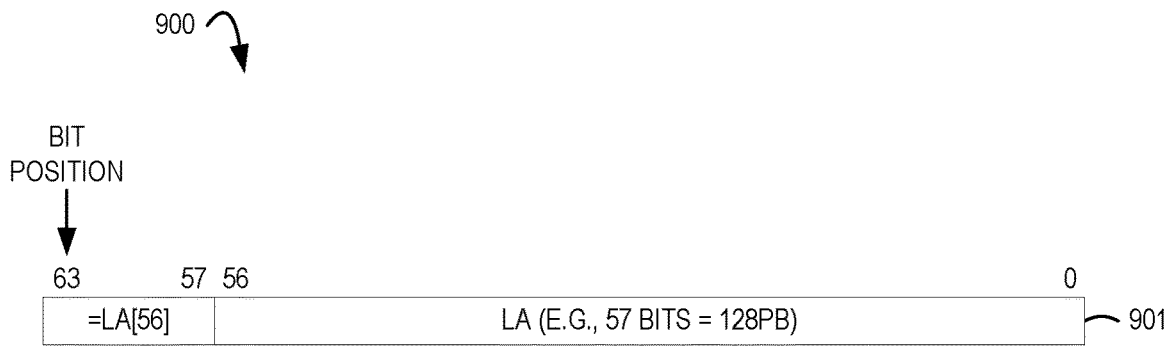
FIG. 9 illustrates a pointer format with an address field and without a memory corruption detection (MCD) value field according to embodiments of the disclosure.

FIG. 9 illustrates a pointer format 900 with an address field 901 and without a memory corruption detection (MCD) value field according to embodiments of the disclosure. For example, a 5-level paging operating system (OS) may support 57 bit linear addresses in address field 901 (e.g., out of 64 bits of space in the pointer 900). The remaining seven upper (e.g., most significant) linear bits may be canonical (e.g., such that all bits 63:57 have the same value as bit 56).

Figure 10:
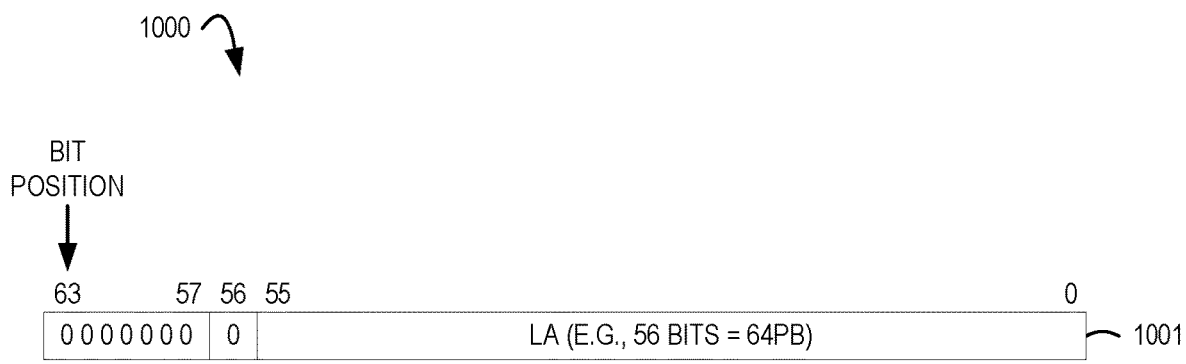
FIG. 10 illustrates a pointer format with an address field and without a memory corruption detection (MCD) value field according to embodiments of the disclosure.

FIG. 10 illustrates a pointer format 1000 with an address field 1001 and without a memory corruption detection (MCD) value field according to embodiments of the disclosure. For example, an OS may give a software application the positive linear address space (e.g., bits 63:56 equal to 0) and reserve the negative linear address space (e.g., bits 63:56 equal to 1) for its own usage.

Figure 11:
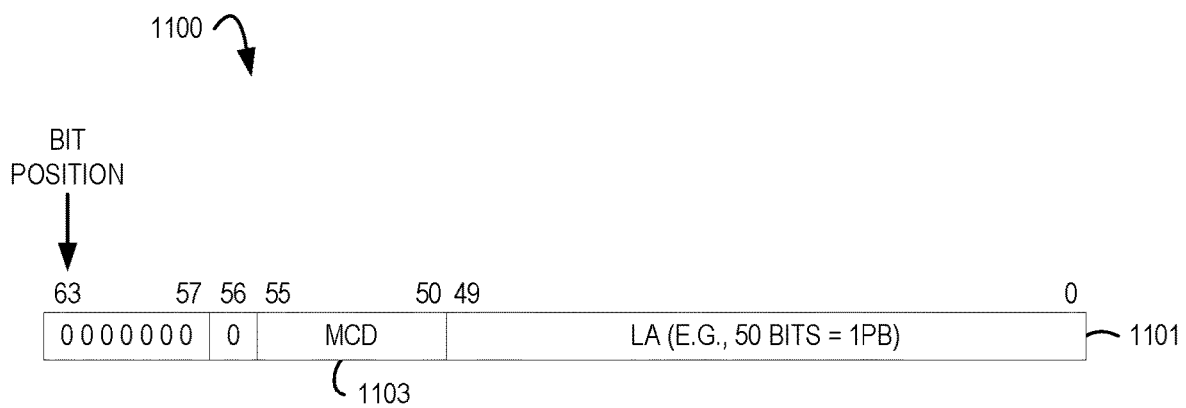
FIG. 11 illustrates a pointer format with an address field, a memory corruption detection (MCD) space field, and a memory corruption detection (MCD) value field according to embodiments of the disclosure.

FIG. 11 illustrates a pointer format 1100 with an address field 1101, a memory corruption detection (MCD) protected space field in bits 63:56, and a memory corruption detection (MCD) value field 1103 according to embodiments of the disclosure. For example, in an embodiment with MCD protection for the application linear address space and still remaining inside the canonical address range, the following attributes may be set (e.g., in a register(s)): MCD.Enabled=True, MCD.Position=50, and MCD.Prefix=00000000.

Figure 12:
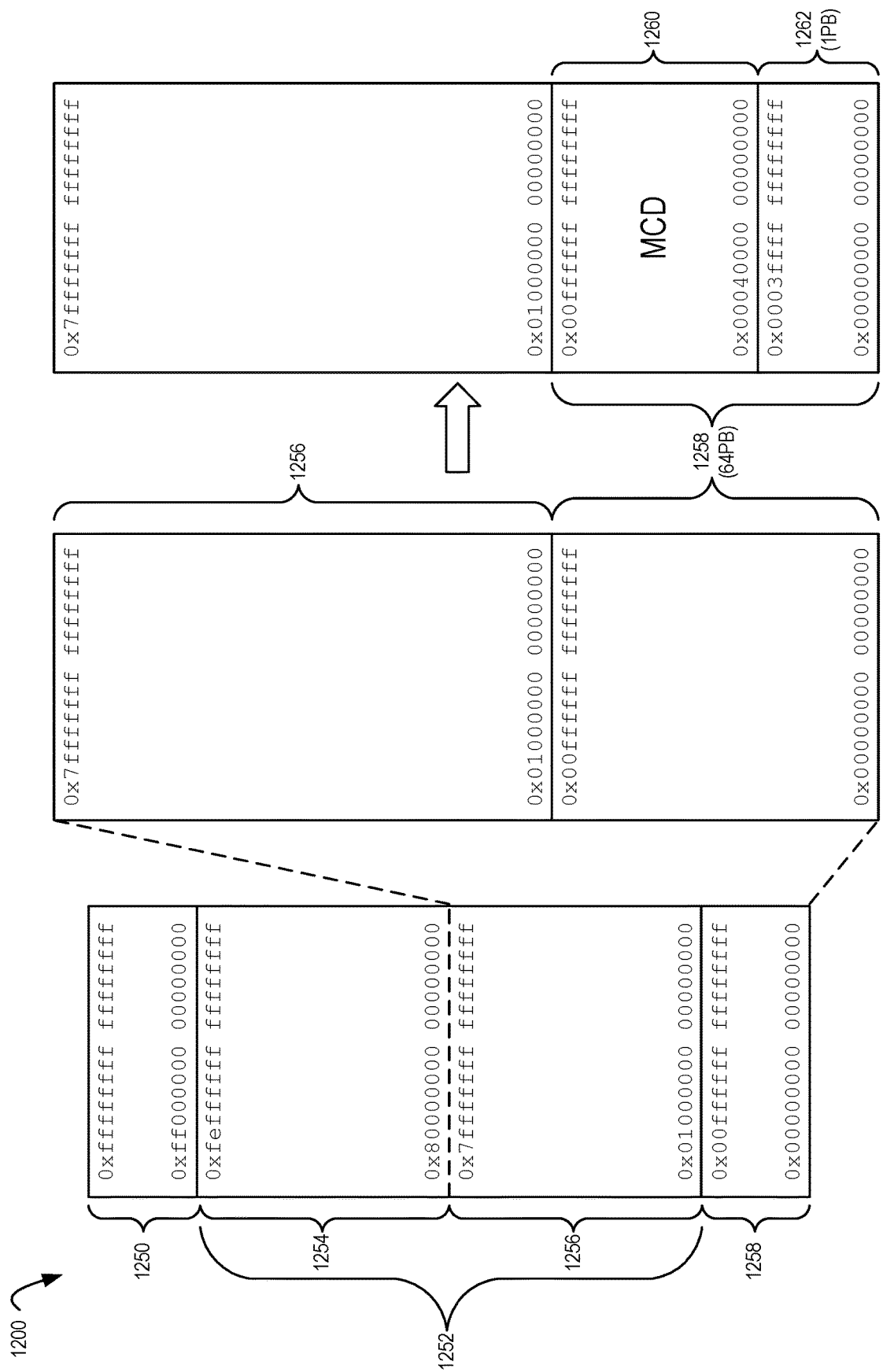
FIG. 12A illustrates a linear address space according to embodiments of the disclosure.
FIG. 12B illustrates a view of a portion of the linear address space in FIG. 12A according to embodiments of the disclosure.
FIG. 12C illustrates a view of the portion of the linear address space in FIG. 12B with a subset of memory corruption detection (MCD) protected space according to embodiments of the disclosure.

FIG. 12A illustrates a linear address space 1200 according to embodiments of the disclosure. Depicted linear address space 1200 may be the entire linear address space that is addressable (e.g., by an OS). Depicted linear address space 1200 includes the negative canonical linear address space 1250, the positive canonical linear address space 1258, the positive non-canonical linear address space 1256, and the negative non-canonical linear address space 1254. In one embodiment, the non-canonical linear address space 1252 includes the addresses where bits 63:57 do not each equal bit 56.

FIG. 12B illustrates a view of a portion of the linear address space 1200 in FIG. 12A according to embodiments of the disclosure. More particularly, FIG. 12B is a zoomed-in view of the positive linear address space (1256 and 1258).

FIG. 12C illustrates a view of the portion of the linear address space 1200 in FIG. 12B with a subset of memory corruption detection (MCD) protected space 1260 according to embodiments of the disclosure. In one embodiment, MCD protected space 1260 is 63 petabytes of positive canonical linear address space out of the 64 petabytes of positive canonical linear address space 1258, e.g., leaving 1 petabyte of positive non-canonical linear address space 1262 not protected by MCD.

Figure 13:
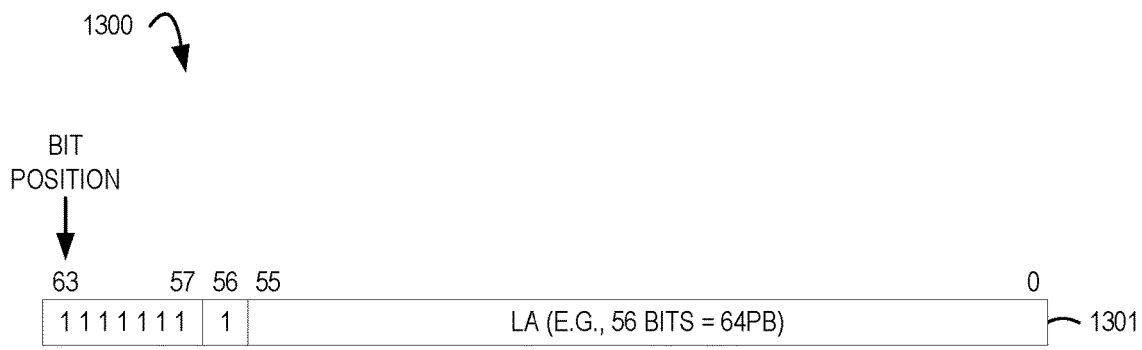
FIG. 13 illustrates a pointer format with an address field and without a memory corruption detection (MCD) value field according to embodiments of the disclosure.

FIG. 13 illustrates a pointer format 1300 with an address field 1301 and without a memory corruption detection (MCD) value field according to embodiments of the disclosure. For example, MCD may be used (e.g., by an OS) to protect a subset of linear address space inside its whole address space. In one embodiment, an OS may reserve the negative address range for its own usage, e.g., as shown in FIG. 13 with bits 63:56 equal to 1.

Figure 14:
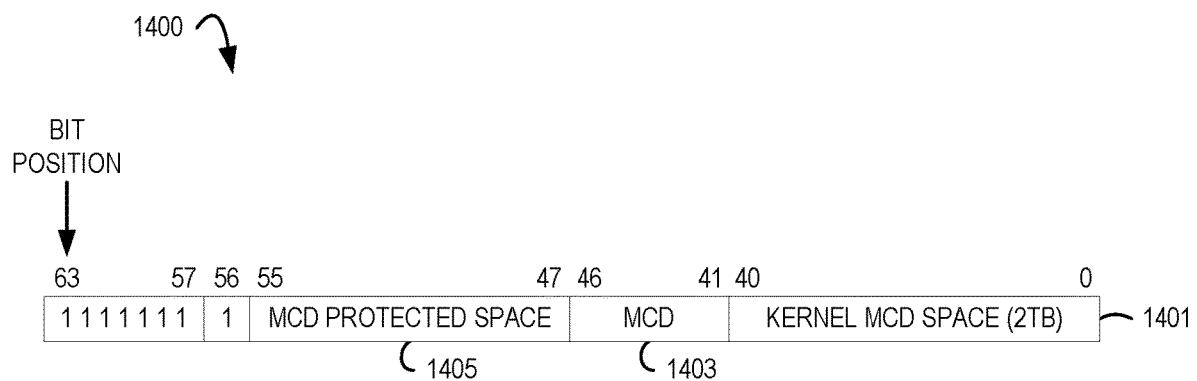
FIG. 14 illustrates a pointer format with an address field, a memory corruption detection (MCD) space field, and a memory corruption detection (MCD) value field according to embodiments of the disclosure.

FIG. 14 illustrates a pointer format 1400 with an address field 1401, a memory corruption detection (MCD) protected space field 1405 (e.g., and bits 63:56), and a memory corruption detection (MCD) value field 1403 according to embodiments of the disclosure. For example, in an embodiment with MCD protection for a subset of the OS linear address space, the following attributes may be set (e.g., in a register(s)): MCD.Enabled=True, MCD.Position=41, and MCD.Prefix=11111111XXXXXXXXX (e.g., where XXXXXXXXX is a specific 9-bit value that defines which area of the negative linear address space is MCD protected).

FIG. 15A illustrates a linear address space 1500 according to embodiments of the disclosure. Depicted linear address space 1500 may be the entire linear address space that is addressable (e.g., by an OS). Depicted linear address space 1500 includes the negative canonical linear address space 1550, the positive canonical linear address space 1558, the positive non-canonical linear address space 1556, and the negative non-canonical linear address space 1554. In one embodiment, the non-canonical linear address space 1552 includes the addresses where bits 63:57 do not each equal bit 56.

FIG. 15B illustrates a view of a portion of the linear address space 1500 in FIG. 15A according to embodiments of the disclosure. More particularly, FIG. 15B is a zoomed-in view of the negative canonical linear address space 1550.

FIG. 15C illustrates a view of the portion of the linear address space 1500 in FIG. 15B with a subset of memory corruption detection (MCD) protected space 1560 according to embodiments of the disclosure. In one embodiment, MCD protected space 1560 is 128 terabytes of available linear address space out of the 64 petabytes of negative canonical linear address space 1550. In one embodiment, MCD protected space section 1560A and MCD protected space section 1560B combined contain the entire address range that matches the MCD.Prefix value (e.g., 111111XXXXXXXXX). In one embodiment, MCD protected space section 1560B are the addresses where a pointer's MCD value is not 0 (e.g., the same as the MCD protected space 1260 in FIG. 12C). In one embodiment, MCD protected space section 1560A are the addresses where the pointer MCD value is 0 (e.g., the same as space 1262 in FIG. 12C). In certain embodiments, all addresses that reside in MCD protected space section 1560B are transformed (e.g., according to the circuit in FIG. 8) and the actual memory operation is to go to the addresses that are in MCD protected space section 1560A.

FIG. 16 illustrates a pointer format 1600 with an address field 1601, a memory corruption detection (MCD) space field, and a memory corruption detection (MCD) value field 1603 according to embodiments of the disclosure. For example, the following attributes may be set (e.g., in a register(s)): MCD.Enabled=True, MCD.Position=57, and MCD.Prefix=0.

FIG. 17A illustrates a linear address space 1700 according to embodiments of the disclosure. Depicted linear address space 1700 may be the entire linear address space that is addressable (e.g., by an OS). Depicted linear address space 1700 includes the negative canonical linear address space 1750, the positive canonical linear address space 1758, the positive non-canonical linear address space 1756, and the negative non-canonical linear address space 1754. In one embodiment, the non-canonical linear address space 1752 includes the addresses where bits 63:57 do not each equal bit 56.

FIG. 17B illustrates a view of a portion of the linear address space 1700 in FIG. 17A according to embodiments of the disclosure. More particularly, FIG. 17B is a zoomed-in view of the positive linear address space (1758 and 1756).

FIG. 17C illustrates a view of the portion of the linear address space 1700 in FIG. 17B with a subset of memory corruption detection (MCD) protected space in the positive, non-canonical linear address space 1756 according to embodiments of the disclosure. In one embodiment, MCD protected space is in alternating sections, e.g., in positive, non-canonical linear address space 1756. In one embodiment, the MCD value in a pointer is in the canonical bits (62:57), but bit 63 is (e.g., be required to be) canonical and equal to bit 56. In one embodiment, this means that the addresses where bit 63 is equal to bit 56 are the MCD protected space and the addresses where bit 63 is not equal to bit 56 are non-canonical. In the depicted embodiment, each MCD protected space section (e.g., box) is the size of address space 1758, but is compressed to illustrate them in this figure.

Figure 18:
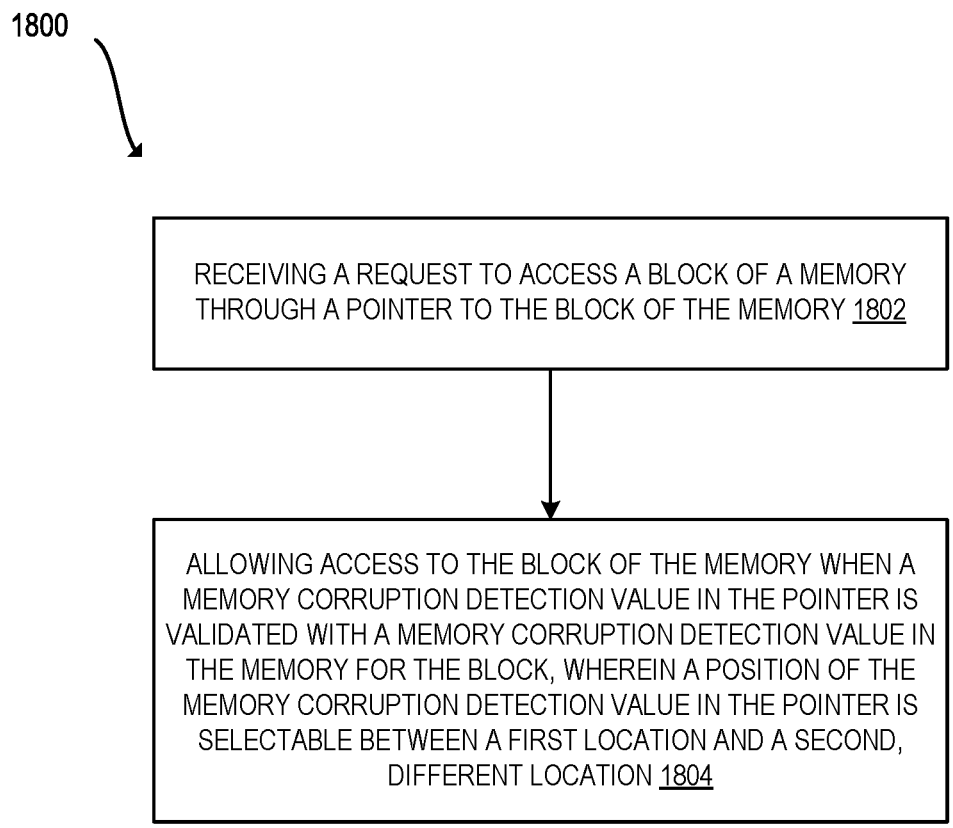
FIG. 18 illustrates a flow diagram according to embodiments of the disclosure.

FIG. 18 illustrates a flow diagram 1800 according to embodiments of the disclosure. Flow diagram 1800 includes receiving a request to access a block of a memory through a pointer to the block of the memory 1802, and allowing access to the block of the memory when a memory corruption detection value in the pointer is validated with a memory corruption detection value in the memory for the block, wherein a position of the memory corruption detection value in the pointer is selectable between a first location and a second, different location 1804.

In one embodiment, a hardware processor includes an execution unit to execute an instruction to request access to a block of a memory through a pointer to the block of the memory, and a memory management unit to allow access to the block of the memory when a memory corruption detection value in the pointer is validated with a memory corruption detection value in the memory for the block, wherein a position of the memory corruption detection value in the pointer is selectable between a first location and a second, different location. The hardware processor may include a control register to set the position to the first location or the second, different location. The hardware processor may include a control register to set a memory corruption detection protected space for a subset of the memory. The pointer may include a memory corruption detection protected space value, and the memory management unit may allow access to the block of the memory without a validation check of the memory corruption detection value in the pointer with the memory corruption detection value in the memory for the block when the memory corruption detection protected space value is not within the memory corruption detection protected space for the subset of the memory. The pointer may include a memory corruption detection protected space value, and the memory management unit may perform a validation check of the memory corruption detection value in the pointer with the memory corruption detection value in the memory for the block when the memory corruption detection protected space value is within the memory corruption detection protected space for the subset of the memory. The hardware processor may include a register to store a base address of a memory corruption detection table in the memory comprising the memory corruption detection value for the block. The position of the memory corruption detection value in the pointer may be selectable between the first location, the second, different location, and a third, different location. The pointer may include a linear address of the block of the memory.

In another embodiment, a method includes receiving a request to access a block of a memory through a pointer to the block of the memory, and allowing access to the block of the memory when a memory corruption detection value in the pointer is validated with a memory corruption detection value in the memory for the block, wherein a position of the memory corruption detection value in the pointer is selectable between a first location and a second, different location. The method may include setting the position to the first location or the second, different location. The method may include setting a memory corruption detection protected space for a subset of the memory. The pointer may include a memory corruption detection protected space value, and the method may include allowing access to the block of the memory without a validation check of the memory corruption detection value in the pointer with the memory corruption detection value in the memory for the block when the memory corruption detection protected space value is not within the memory corruption detection protected space for the subset of the memory. The pointer may include a memory corruption detection protected space value, and the method may include performing a validation check of the memory corruption detection value in the pointer with the memory corruption detection value in the memory for the block when the memory corruption detection protected space value is within the memory corruption detection protected space for the subset of the memory. The method may include storing a base address of a memory corruption detection table in the memory comprising the memory corruption detection value for the block. The position of the memory corruption detection value in the pointer may be selectable between the first location, the second, different location, and a third, different location. The pointer may include a linear address of the block of the memory.

In yet another embodiment, a system includes a memory, a hardware processor comprising an execution unit to execute an instruction to request access to a block of the memory through a pointer to the block of the memory, and a memory management unit to allow access to the block of the memory when a memory corruption detection value in the pointer is validated with a memory corruption detection value in the memory for the block, wherein a position of the memory corruption detection value in the pointer is selectable between a first location and a second, different location. The system may include a control register to set the position to the first location or the second, different location. The system may include a control register to set a memory corruption detection protected space for a subset of the memory. The pointer may include a memory corruption detection protected space value, and the memory management unit may allow access to the block of the memory without a validation check of the memory corruption detection value in the pointer with the memory corruption detection value in the memory for the block when the memory corruption detection protected space value is not within the memory corruption detection protected space for the subset of the memory. The pointer may include a memory corruption detection protected space value, and the memory management unit may perform a validation check of the memory corruption detection value in the pointer with the memory corruption detection value in the memory for the block when the memory corruption detection protected space value is within the memory corruption detection protected space for the subset of the memory. The system may include a register to store a base address of a memory corruption detection table in the memory comprising the memory corruption detection value for the block. The position of the memory corruption detection value in the pointer may be selectable between the first location, the second, different location, and a third, different location. The pointer may include a linear address of the block of the memory.

In another embodiment, a hardware processor includes means to execute an instruction to request access to a block of a memory through a pointer to the block of the memory, and means to allow access to the block of the memory when a memory corruption detection value in the pointer is validated with a memory corruption detection value in the memory for the block, wherein a position of the memory corruption detection value in the pointer is selectable between a first location and a second, different location.

In yet another embodiment, an apparatus comprises a data storage device that stores code that when executed by a hardware processor causes the hardware processor to perform any method disclosed herein. An apparatus may be as described in the detailed description. A method may be as described in the detailed description.

An instruction set may include one or more instruction formats. A given instruction format may define various fields (e.g., number of bits, location of bits) to specify, among other things, the operation to be performed (e.g., opcode) and the operand(s) on which that operation is to be performed and/or other data field(s) (e.g., mask). Some instruction formats are further broken down though the definition of instruction templates (or subformats). For example, the instruction templates of a given instruction format may be defined to have different subsets of the instruction format's fields (the included fields are typically in the same order, but at least some have different bit positions because there are less fields included) and/or defined to have a given field interpreted differently. Thus, each instruction of an ISA is expressed using a given instruction format (and, if defined, in a given one of the instruction templates of that instruction format) and includes fields for specifying the operation and the operands. For example, an exemplary ADD instruction has a specific opcode and an instruction format that includes an opcode field to specify that opcode and operand fields to select operands (source1/destination and source2); and an occurrence of this ADD instruction in an instruction stream will have specific contents in the operand fields that select specific operands. A set of SIMD extensions referred to as the Advanced Vector Extensions (AVX) (AVX1 and AVX2) and using the Vector Extensions (VEX) coding scheme has been released and/or published (e.g., see Intel® 64 and IA-32 Architectures Software Developer's Manual, September 2015; and see Intel® Architecture Instruction Set Extensions Programming Reference, August 2015).

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

Exemplary Core Architectures

In-Order and Out-of-Order Core Block Diagram

FIG. 19A is a block diagram illustrating both an exemplary in-order pipeline and an exemplary register renaming, out-of-order issue/execution pipeline according to embodiments of the disclosure. FIG. 19B is a block diagram illustrating both an exemplary embodiment of an in-order architecture core and an exemplary register renaming, out-of-order issue/execution architecture core to be included in a processor according to embodiments of the disclosure. The solid lined boxes in FIGS. 19A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 19A, a processor pipeline 1900 includes a fetch stage 1902, a length decode stage 1904, a decode stage 1906, an allocation stage 1908, a renaming stage 1910, a scheduling (also known as a dispatch or issue) stage 1912, a register read/memory read stage 1914, an execute stage 1916, a write back/memory write stage 1918, an exception handling stage 1922, and a commit stage 1924.

FIG. 19B shows processor core 1990 including a front end unit 1930 coupled to an execution engine unit 1950, and both are coupled to a memory unit 1970. The core 1990 may be a reduced instruction set computing (RISC) core, a complex instruction set computing (CISC) core, a very long instruction word (VLIW) core, or a hybrid or alternative core type. As yet another option, the core 1990 may be a special-purpose core, such as, for example, a network or communication core, compression engine, coprocessor core, general purpose computing graphics processing unit (GPGPU) core, graphics core, or the like.

The front end unit 1930 includes a branch prediction unit 1932 coupled to an instruction cache unit 1934, which is coupled to an instruction translation lookaside buffer (TLB) 1936, which is coupled to an instruction fetch unit 1938, which is coupled to a decode unit 1940. The decode unit 1940 (or decoder or decoder unit) may decode instructions (e.g., macroinstructions), and generate as an output one or more micro-operations, micro-code entry points, microinstructions, other instructions, or other control signals, which are decoded from, or which otherwise reflect, or are derived from, the original instructions. The decode unit 1940 may be implemented using various different mechanisms. Examples of suitable mechanisms include, but are not limited to, look-up tables, hardware implementations, programmable logic arrays (PLAs), microcode read only memories (ROMs), etc. In one embodiment, the core 1990 includes a microcode ROM or other medium that stores microcode for certain macroinstructions (e.g., in decode unit 1940 or otherwise within the front end unit 1930). The decode unit 1940 is coupled to a rename/allocator unit 1952 in the execution engine unit 1950.

The execution engine unit 1950 includes the rename/allocator unit 1952 coupled to a retirement unit 1954 and a set of one or more scheduler unit(s) 1956. The scheduler unit(s) 1956 represents any number of different schedulers, including reservations stations, central instruction window, etc. The scheduler unit(s) 1956 is coupled to the physical register file(s) unit(s) 1958. Each of the physical register file(s) units 1958 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 1958 comprises a vector registers unit, a write mask registers unit, and a scalar registers unit. These register units may provide architectural vector registers, vector mask registers, and general purpose registers. The physical register file(s) unit(s) 1958 is overlapped by the retirement unit 1954 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 1954 and the physical register file(s) unit(s) 1958 are coupled to the execution cluster(s) 1960. The execution cluster(s) 1960 includes a set of one or more execution units 1962 and a set of one or more memory access units 1964. The execution units 1962 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 1956, physical register file(s) unit(s) 1958, and execution cluster(s) 1960 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 1964). It should also be understood that where separate pipelines are used, one or more of these pipelines may be out-of-order issue/execution and the rest in-order.

The set of memory access units 1964 is coupled to the memory unit 1970, which includes a data TLB unit 1972 coupled to a data cache unit 1974 coupled to a level 2 (L2) cache unit 1976. In one exemplary embodiment, the memory access units 1964 may include a load unit, a store address unit, and a store data unit, each of which is coupled to the data TLB unit 1972 in the memory unit 1970. The instruction cache unit 1934 is further coupled to a level 2 (L2) cache unit 1976 in the memory unit 1970. The L2 cache unit 1976 is coupled to one or more other levels of cache and eventually to a main memory.

By way of example, the exemplary register renaming, out-of-order issue/execution core architecture may implement the pipeline 1900 as follows: 1) the instruction fetch 1938 performs the fetch and length decoding stages 1902 and 1904; 2) the decode unit 1940 performs the decode stage 1906; 3) the rename/allocator unit 1952 performs the allocation stage 1908 and renaming stage 1910; 4) the scheduler unit(s) 1956 performs the schedule stage 1912; 5) the physical register file(s) unit(s) 1958 and the memory unit 1970 perform the register read/memory read stage 1914; the execution cluster 1960 perform the execute stage 1916; 6) the memory unit 1970 and the physical register file(s) unit(s) 1958 perform the write back/memory write stage 1918; 7) various units may be involved in the exception handling stage 1922; and 8) the retirement unit 1954 and the physical register file(s) unit(s) 1958 perform the commit stage 1924.

The core 1990 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 1990 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 1934/1974 and a shared L2 cache unit 1976, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Specific Exemplary In-Order Core Architecture

Figure 20B:
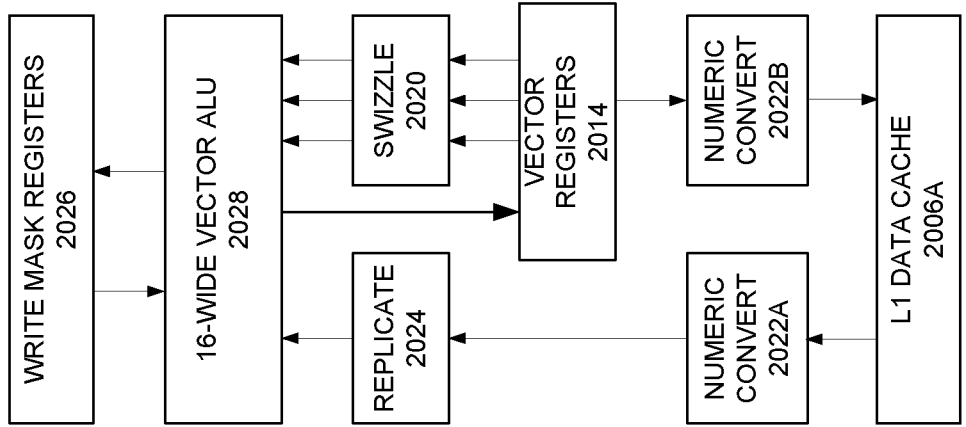
FIG. 20B is an expanded view of part of the processor core in FIG. 20A according to embodiments of the disclosure.
Figure 20A:
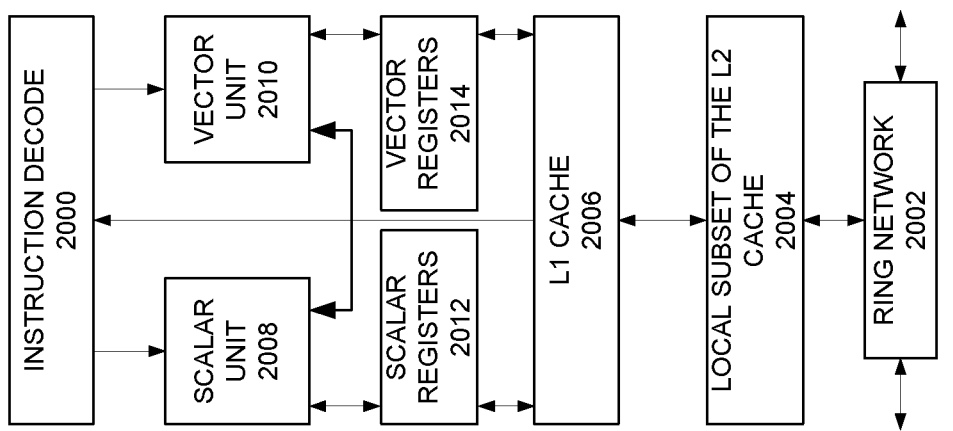
FIG. 20A is a block diagram of a single processor core, along with its connection to the on-die interconnect network and with its local subset of the Level 2 (L2) cache, according to embodiments of the disclosure.

FIGS. 20A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 20A is a block diagram of a single processor core, along with its connection to the on-die interconnect network 2002 and with its local subset of the Level 2 (L2) cache 2004, according to embodiments of the disclosure. In one embodiment, an instruction decode unit 2000 supports the x86 instruction set with a packed data instruction set extension. An L1 cache 2006 allows low-latency accesses to cache memory into the scalar and vector units. While in one embodiment (to simplify the design), a scalar unit 2008 and a vector unit 2010 use separate register sets (respectively, scalar registers 2012 and vector registers 2014) and data transferred between them is written to memory and then read back in from a level 1 (L1) cache 2006, alternative embodiments of the disclosure may use a different approach (e.g., use a single register set or include a communication path that allow data to be transferred between the two register files without being written and read back).

The local subset of the L2 cache 2004 is part of a global L2 cache that is divided into separate local subsets, one per processor core. Each processor core has a direct access path to its own local subset of the L2 cache 2004. Data read by a processor core is stored in its L2 cache subset 2004 and can be accessed quickly, in parallel with other processor cores accessing their own local L2 cache subsets. Data written by a processor core is stored in its own L2 cache subset 2004 and is flushed from other subsets, if necessary. The ring network ensures coherency for shared data. The ring network is bi-directional to allow agents such as processor cores, L2 caches and other logic blocks to communicate with each other within the chip. Each ring data-path is 1012-bits wide per direction.

FIG. 20B is an expanded view of part of the processor core in FIG. 20A according to embodiments of the disclosure. FIG. 20B includes an L1 data cache 2006A part of the L1 cache 2004, as well as more detail regarding the vector unit 2010 and the vector registers 2014. Specifically, the vector unit 2010 is a 16-wide vector processing unit (VPU) (see the 16-wide ALU 2028), which executes one or more of integer, single-precision float, and double-precision float instructions. The VPU supports swizzling the register inputs with swizzle unit 2020, numeric conversion with numeric convert units 2022A-B, and replication with replication unit 2024 on the memory input. Write mask registers 2026 allow predicating resulting vector writes.

Figure 21:
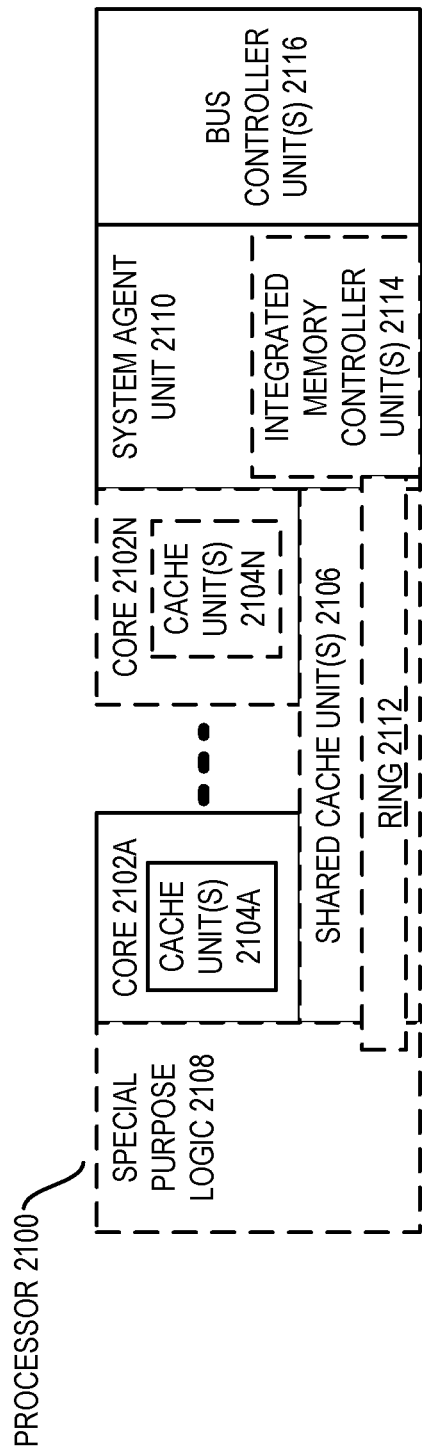
FIG. 21 is a block diagram of a processor that may have more than one core, may have an integrated memory controller, and may have integrated graphics according to embodiments of the disclosure.

FIG. 21 is a block diagram of a processor 2100 that may have more than one core, may have an integrated memory controller, and may have integrated graphics according to embodiments of the disclosure. The solid lined boxes in FIG. 21 illustrate a processor 2100 with a single core 2102A, a system agent 2110, a set of one or more bus controller units 2116, while the optional addition of the dashed lined boxes illustrates an alternative processor 2100 with multiple cores 2102A-N, a set of one or more integrated memory controller unit(s) 2114 in the system agent unit 2110, and special purpose logic 2108.

Thus, different implementations of the processor 2100 may include: 1) a CPU with the special purpose logic 2108 being integrated graphics and/or scientific (throughput) logic (which may include one or more cores), and the cores 2102A-N being one or more general purpose cores (e.g., general purpose in-order cores, general purpose out-of-order cores, a combination of the two); 2) a coprocessor with the cores 2102A-N being a large number of special purpose cores intended primarily for graphics and/or scientific (throughput); and 3) a coprocessor with the cores 2102A-N being a large number of general purpose in-order cores. Thus, the processor 2100 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 2100 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 2106, and external memory (not shown) coupled to the set of integrated memory controller units 2114. The set of shared cache units 2106 may include one or more mid-level caches, such as level 2 (L2), level 3 (L3), level 4 (L4), or other levels of cache, a last level cache (LLC), and/or combinations thereof. While in one embodiment a ring based interconnect unit 2112 interconnects the integrated graphics logic 2108, the set of shared cache units 2106, and the system agent unit 2110/integrated memory controller unit(s) 2114, alternative embodiments may use any number of well-known techniques for interconnecting such units. In one embodiment, coherency is maintained between one or more cache units 2106 and cores 2102-A-N.

In some embodiments, one or more of the cores 2102A-N are capable of multi-threading. The system agent 2110 includes those components coordinating and operating cores 2102A-N. The system agent unit 2110 may include for example a power control unit (PCU) and a display unit. The PCU may be or include logic and components needed for regulating the power state of the cores 2102A-N and the integrated graphics logic 2108. The display unit is for driving one or more externally connected displays.

The cores 2102A-N may be homogenous or heterogeneous in terms of architecture instruction set; that is, two or more of the cores 2102A-N may be capable of execution the same instruction set, while others may be capable of executing only a subset of that instruction set or a different instruction set.

Exemplary Computer Architectures

FIGS. 22-25 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 22:
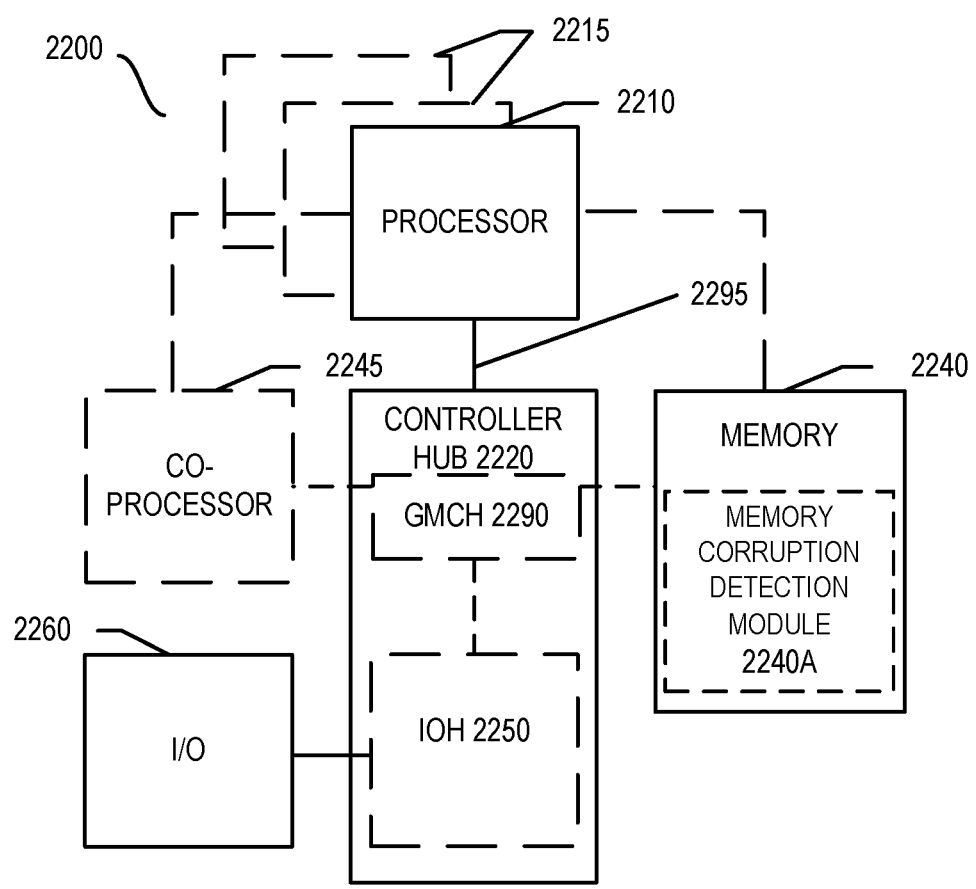
FIG. 22 is a block diagram of a system in accordance with one embodiment of the present disclosure.

Referring now to FIG. 22, shown is a block diagram of a system 2200 in accordance with one embodiment of the present disclosure. The system 2200 may include one or more processors 2210, 2215, which are coupled to a controller hub 2220. In one embodiment the controller hub 2220 includes a graphics memory controller hub (GMCH) 2290 and an Input/Output Hub (IOH) 2250 (which may be on separate chips); the GMCH 2290 includes memory and graphics controllers to which are coupled memory 2240 and a coprocessor 2245; the IOH 2250 is couples input/output (I/O) devices 2260 to the GMCH 2290. Alternatively, one or both of the memory and graphics controllers are integrated within the processor (as described herein), the memory 2240 and the coprocessor 2245 are coupled directly to the processor 2210, and the controller hub 2220 in a single chip with the IOH 2250. Memory 2240 may include a memory corruption detection module 2240A, for example, to store code that when executed causes a processor to perform any method of this disclosure. In another embodiment, memory corruption detection module 2240A resides inside a processor and communicates with memory 2240.

The optional nature of additional processors 2215 is denoted in FIG. 22 with broken lines. Each processor 2210, 2215 may include one or more of the processing cores described herein and may be some version of the processor 2100.

The memory 2240 may be, for example, dynamic random access memory (DRAM), phase change memory (PCM), or a combination of the two. For at least one embodiment, the controller hub 2220 communicates with the processor(s) 2210, 2215 via a multi-drop bus, such as a frontside bus (FSB), point-to-point interface such as QuickPath Interconnect (QPI), or similar connection 2295.

In one embodiment, the coprocessor 2245 is a special-purpose processor, such as, for example, a high-throughput MIC processor, a network or communication processor, compression engine, graphics processor, GPGPU, embedded processor, or the like. In one embodiment, controller hub 2220 may include an integrated graphics accelerator.

There can be a variety of differences between the physical resources 2210, 2215 in terms of a spectrum of metrics of merit including architectural, microarchitectural, thermal, power consumption characteristics, and the like.

In one embodiment, the processor 2210 executes instructions that control data processing operations of a general type. Embedded within the instructions may be coprocessor instructions. The processor 2210 recognizes these coprocessor instructions as being of a type that should be executed by the attached coprocessor 2245. Accordingly, the processor 2210 issues these coprocessor instructions (or control signals representing coprocessor instructions) on a coprocessor bus or other interconnect, to coprocessor 2245. Coprocessor(s) 2245 accept and execute the received coprocessor instructions.

Figure 23:
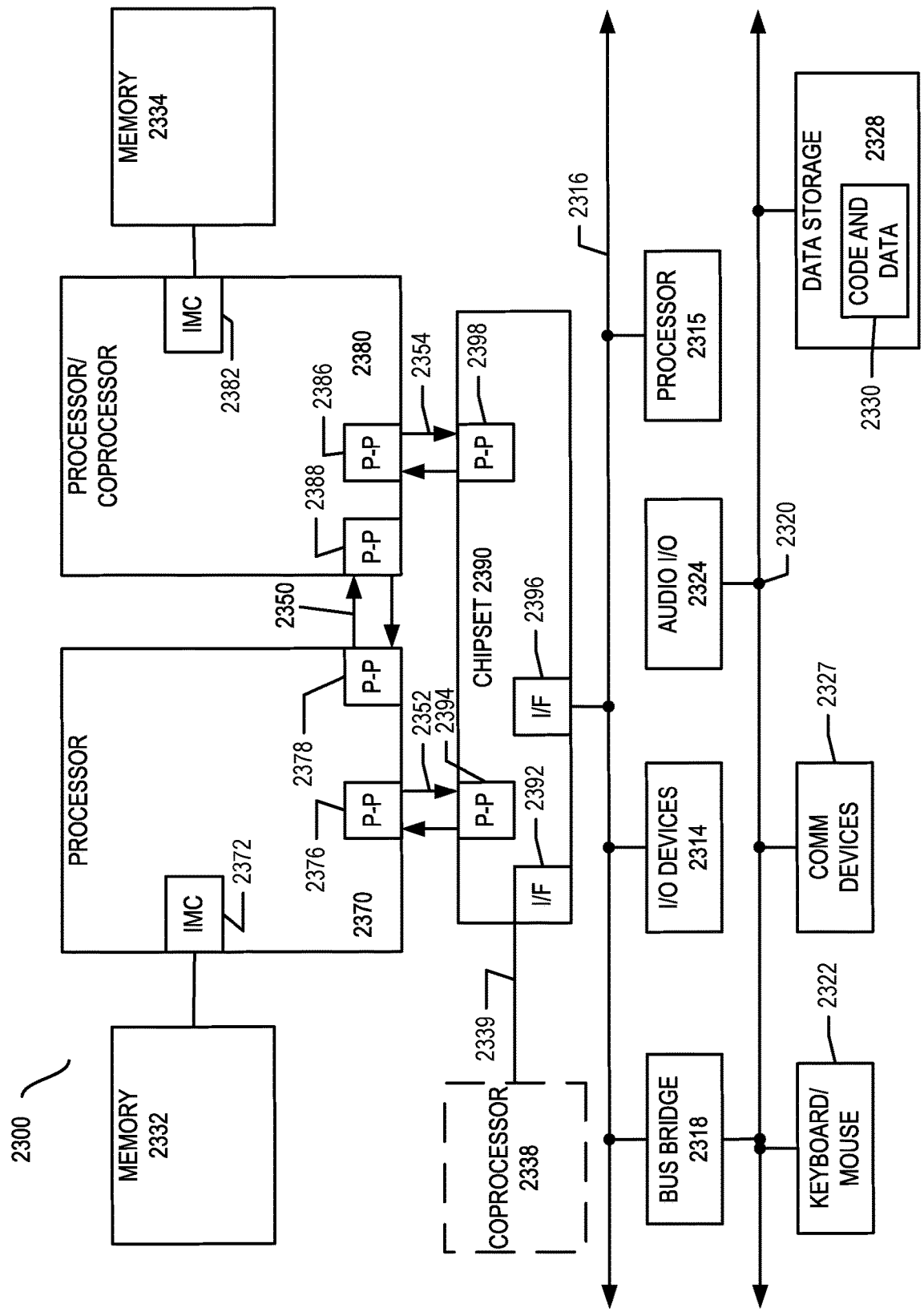
FIG. 23 is a block diagram of a more specific exemplary system in accordance with an embodiment of the present disclosure.

Referring now to FIG. 23, shown is a block diagram of a first more specific exemplary system 2300 in accordance with an embodiment of the present disclosure. As shown in FIG. 23, multiprocessor system 2300 is a point-to-point interconnect system, and includes a first processor 2370 and a second processor 2380 coupled via a point-to-point interconnect 2350. Each of processors 2370 and 2380 may be some version of the processor 2100. In one embodiment of the disclosure, processors 2370 and 2380 are respectively processors 2210 and 2215, while coprocessor 2338 is coprocessor 2245. In another embodiment, processors 2370 and 2380 are respectively processor 2210 coprocessor 2245.

Processors 2370 and 2380 are shown including integrated memory controller (IMC) units 2372 and 2382, respectively. Processor 2370 also includes as part of its bus controller units point-to-point (P-P) interfaces 2376 and 2378; similarly, second processor 2380 includes P-P interfaces 2386 and 2388. Processors 2370, 2380 may exchange information via a point-to-point (P-P) interface 2350 using P-P interface circuits 2378, 2388. As shown in FIG. 23, IMCs 2372 and 2382 couple the processors to respective memories, namely a memory 2332 and a memory 2334, which may be portions of main memory locally attached to the respective processors.

Processors 2370, 2380 may each exchange information with a chipset 2390 via individual P-P interfaces 2352, 2354 using point to point interface circuits 2376, 2394, 2386, 2398. Chipset 2390 may optionally exchange information with the coprocessor 2338 via a high-performance interface 2339. In one embodiment, the coprocessor 2338 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 2390 may be coupled to a first bus 2316 via an interface 2396. In one embodiment, first bus 2316 may be a Peripheral Component Interconnect (PCI) bus, or a bus such as a PCI Express bus or another third generation I/O interconnect bus, although the scope of the present disclosure is not so limited.

As shown in FIG. 23, various I/O devices 2314 may be coupled to first bus 2316, along with a bus bridge 2318 which couples first bus 2316 to a second bus 2320. In one embodiment, one or more additional processor(s) 2315, such as coprocessors, high-throughput MIC processors, GPGPU's, accelerators (such as, e.g., graphics accelerators or digital signal processing (DSP) units), field programmable gate arrays, or any other processor, are coupled to first bus 2316. In one embodiment, second bus 2320 may be a low pin count (LPC) bus. Various devices may be coupled to a second bus 2320 including, for example, a keyboard and/or mouse 2322, communication devices 2327 and a storage unit 2328 such as a disk drive or other mass storage device which may include instructions/code and data 2330, in one embodiment. Further, an audio I/O 2324 may be coupled to the second bus 2320. Note that other architectures are possible. For example, instead of the point-to-point architecture of FIG. 23, a system may implement a multi-drop bus or other such architecture.

Figure 24:
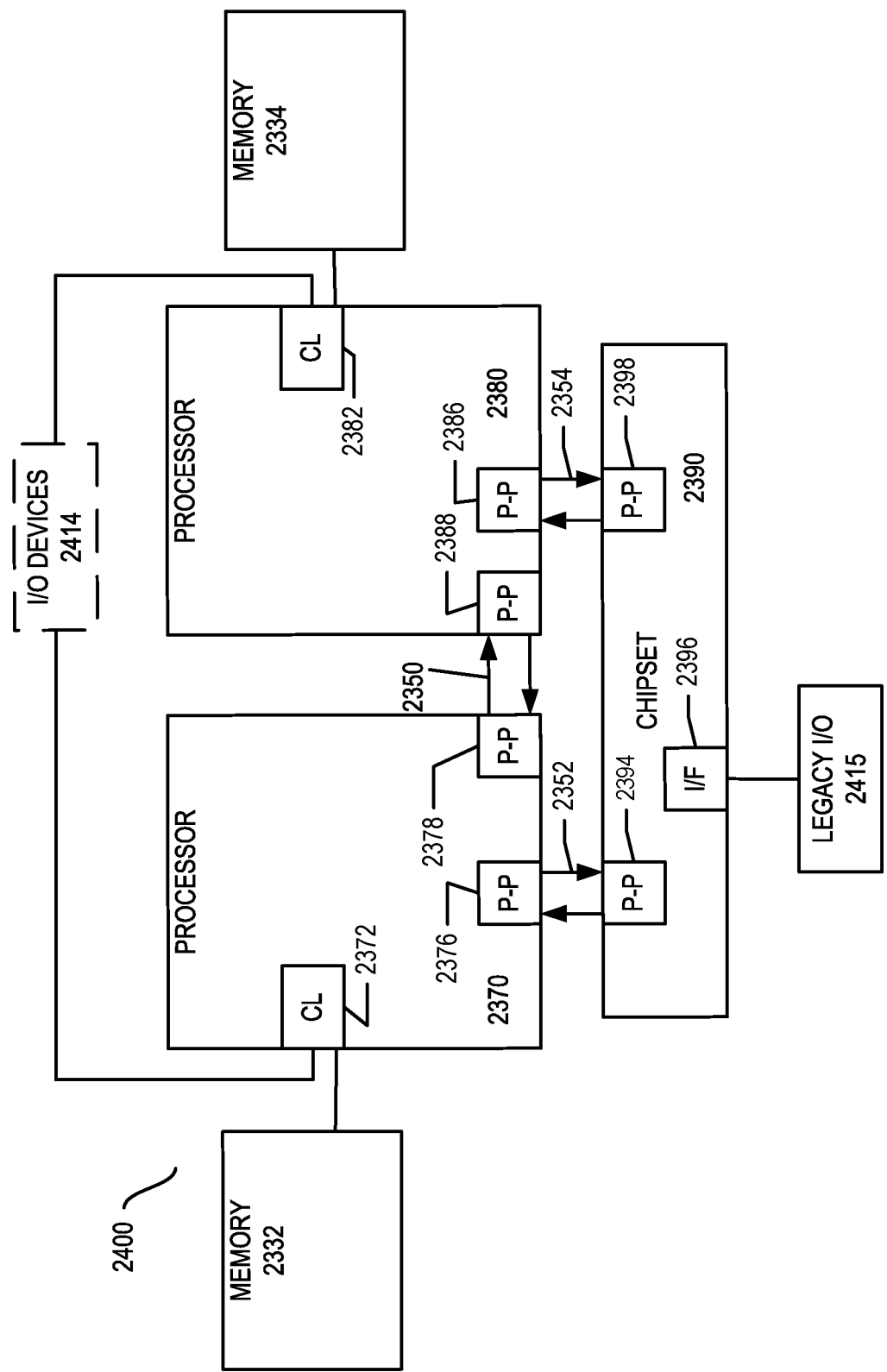
FIG. 24, shown is a block diagram of a second more specific exemplary system in accordance with an embodiment of the present disclosure.

Referring now to FIG. 24, shown is a block diagram of a second more specific exemplary system 2400 in accordance with an embodiment of the present disclosure. Like elements in FIGS. 23 and 24 bear like reference numerals, and certain aspects of FIG. 23 have been omitted from FIG. 24 in order to avoid obscuring other aspects of FIG. 24.

FIG. 24 illustrates that the processors 2370, 2380 may include integrated memory and I/O control logic ("CL") 2372 and 2382, respectively. Thus, the CL 2372, 2382 include integrated memory controller units and include I/O control logic. FIG. 24 illustrates that not only are the memories 2332, 2334 coupled to the CL 2372, 2382, but also that I/O devices 2414 are also coupled to the control logic 2372, 2382. Legacy I/O devices 2415 are coupled to the chipset 2390.

Figure 25:
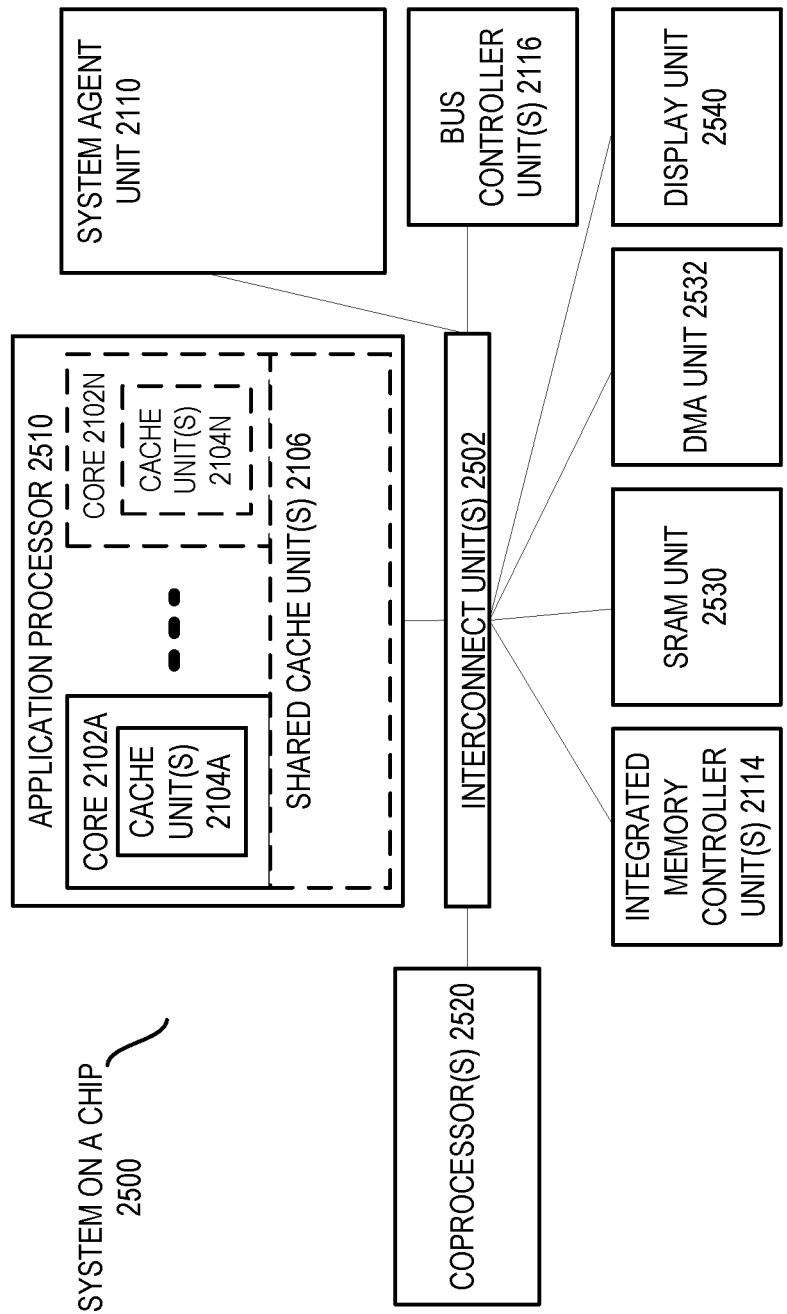
FIG. 25, shown is a block diagram of a system on a chip (SoC) in accordance with an embodiment of the present disclosure.

Referring now to FIG. 25, shown is a block diagram of a SoC 2500 in accordance with an embodiment of the present disclosure. Similar elements in FIG. 21 bear like reference numerals. Also, dashed lined boxes are optional features on more advanced SoCs. In FIG. 25, an interconnect unit(s) 2502 is coupled to: an application processor 2510 which includes a set of one or more cores 202A-N and shared cache unit(s) 2106; a system agent unit 2110; a bus controller unit(s) 2116; an integrated memory controller unit(s) 2114; a set or one or more coprocessors 2520 which may include integrated graphics logic, an image processor, an audio processor, and a video processor; an static random access memory (SRAM) unit 2530; a direct memory access (DMA) unit 2532; and a display unit 2540 for coupling to one or more external displays. In one embodiment, the coprocessor(s) 2520 include a special-purpose processor, such as, for example, a network or communication processor, compression engine, GPGPU, a high-throughput MIC processor, embedded processor, or the like.

Embodiments (e.g., of the mechanisms) disclosed herein may be implemented in hardware, software, firmware, or a combination of such implementation approaches. Embodiments of the disclosure may be implemented as computer programs or program code executing on programmable systems comprising at least one processor, a storage system (including volatile and non-volatile memory and/or storage elements), at least one input device, and at least one output device.

Program code, such as code 2330 illustrated in FIG. 23, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the disclosure also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphing, Etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 26:
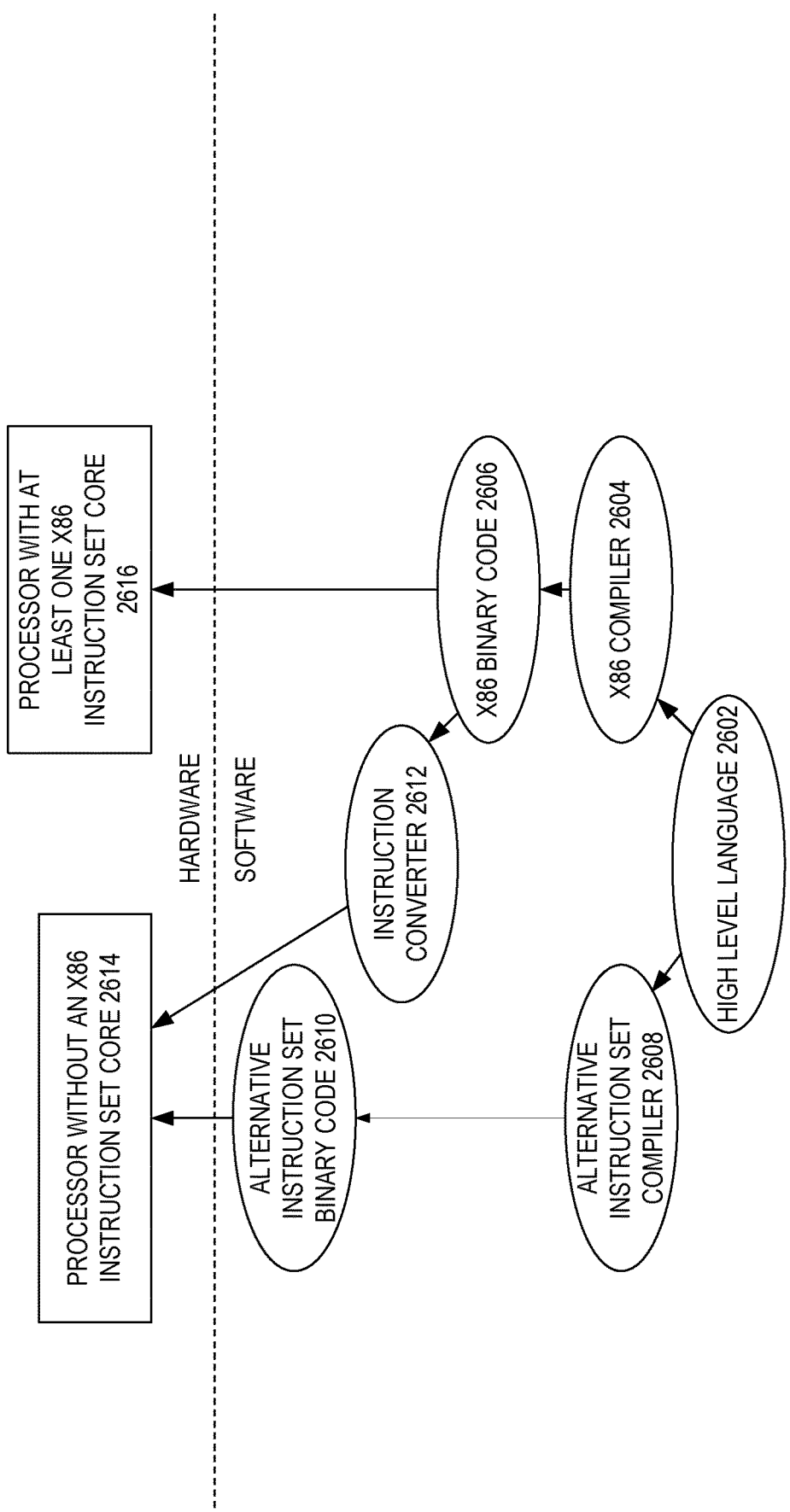
FIG. 26 is a block diagram contrasting the use of a software instruction converter to convert binary instructions in a source instruction set to binary instructions in a target instruction set according to embodiments of the disclosure.

FIG. 26 is a block diagram contrasting the use of a software instruction converter to convert binary instructions in a source instruction set to binary instructions in a target instruction set according to embodiments of the disclosure. In the illustrated embodiment, the instruction converter is a software instruction converter, although alternatively the instruction converter may be implemented in software, firmware, hardware, or various combinations thereof. FIG. 26 shows a program in a high level language 2602 may be compiled using an x86 compiler 2604 to generate x86 binary code 2606 that may be natively executed by a processor with at least one x86 instruction set core 2616. The processor with at least one x86 instruction set core 2616 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 2604 represents a compiler that is operable to generate x86 binary code 2606 (e.g., object code) that can, with or without additional linkage processing, be executed on the processor with at least one x86 instruction set core 2616. Similarly, FIG. 26 shows the program in the high level language 2602 may be compiled using an alternative instruction set compiler 2608 to generate alternative instruction set binary code 2610 that may be natively executed by a processor without at least one x86 instruction set core 2614 (e.g., a processor with cores that execute the MIPS instruction set of MIPS Technologies of Sunnyvale, Calif. and/or that execute the ARM instruction set of ARM Holdings of Sunnyvale, Calif.). The instruction converter 2612 is used to convert the x86 binary code 2606 into code that may be natively executed by the processor without an x86 instruction set core 2614. This converted code is not likely to be the same as the alternative instruction set binary code 2610 because an instruction converter capable of this is difficult to make; however, the converted code will accomplish the general operation and be made up of instructions from the alternative instruction set. Thus, the instruction converter 2612 represents software, firmware, hardware, or a combination thereof that, through emulation, simulation or any other process, allows a processor or other electronic device that does not have an x86 instruction set processor or core to execute the x86 binary code 2606.

What is claimed is:

1. A hardware processor comprising:
   an execution unit to execute an instruction to request access to a block of a memory through a pointer to the block of the memory; and
   a memory management unit to allow access to the block of the memory when a memory corruption detection value in the pointer is validated with a memory corruption detection value in the memory for the block, wherein a position of the memory corruption detection value in the pointer is in a location that does not include a most significant bit of the pointer.

2. The hardware processor of claim 1, further comprising a control register to set the position to the location.

3. The hardware processor of claim 1, further comprising a control register to set a memory corruption detection protected space for a subset of the memory.

4. The hardware processor of claim 3, wherein the pointer further comprises a memory corruption detection protected space value, and the memory management unit is to allow access to the block of the memory without a validation check of the memory corruption detection value in the pointer with the memory corruption detection value in the memory for the block when the memory corruption detection protected space value is not within the memory corruption detection protected space for the subset of the memory.

5. The hardware processor of claim 3, wherein the pointer further comprises a memory corruption detection protected space value, and the memory management unit is to perform a validation check of the memory corruption detection value in the pointer with the memory corruption detection value in the memory for the block when the memory corruption detection protected space value is within the memory corruption detection protected space for the subset of the memory.

6. The hardware processor of claim 1, further comprising a register to store a base address of a memory corruption detection table in the memory comprising the memory corruption detection value for the block.

7. The hardware processor of claim 1, wherein the position of the memory corruption detection value in the pointer in the location does not include a least significant bit of the pointer.

8. The hardware processor of claim 1, wherein the pointer comprises a linear address of the block of the memory.

9. A method comprising:
   receiving a request to access a block of a memory through a pointer to the block of the memory; and
   allowing access to the block of the memory when a memory corruption detection value in the pointer is validated with a memory corruption detection value in the memory for the block, wherein a position of the memory corruption detection value in the pointer is in a location that does not include a most significant bit of the pointer.

10. The method of claim 9, further comprising writing to a register to set the position to the location.

11. The method of claim 9, further comprising setting a memory corruption detection protected space for a subset of the memory.

12. The method of claim 11, wherein the pointer further comprises a memory corruption detection protected space value, and further comprising allowing access to the block of the memory without a validation check of the memory corruption detection value in the pointer with the memory corruption detection value in the memory for the block when the memory corruption detection protected space value is not within the memory corruption detection protected space for the subset of the memory.

13. The method of claim 11, wherein the pointer further comprises a memory corruption detection protected space value, and further comprising perform a validation check of the memory corruption detection value in the pointer with the memory corruption detection value in the memory for the block when the memory corruption detection protected space value is within the memory corruption detection protected space for the subset of the memory.

14. The method of claim 9, further comprising storing a base address of a memory corruption detection table in the memory comprising the memory corruption detection value for the block.

15. The method of claim 9, wherein the position of the memory corruption detection value in the pointer in the location does not include a least significant bit of the pointer.

16. The method of claim 9, wherein the pointer comprises a linear address of the block of the memory.

17. A system comprising:
- a memory;
- a hardware processor comprising an execution unit to execute an instruction to request access to a block of the memory through a pointer to the block of the memory; and
- a memory management unit to allow access to the block of the memory when a memory corruption detection value in the pointer is validated with a memory corruption detection value in the memory for the block, wherein a position of the memory corruption detection value in the pointer is a location that does not include a most significant bit of the pointer.

18. The system of claim 17, further comprising a control register to set the position to the location.

19. The system of claim 17, further comprising a control register to set a memory corruption detection protected space for a subset of the memory.

20. The system of claim 19, wherein the pointer further comprises a memory corruption detection protected space value, and the memory management unit is to allow access to the block of the memory without a validation check of the memory corruption detection value in the pointer with the memory corruption detection value in the memory for the block when the memory corruption detection protected space value is not within the memory corruption detection protected space for the subset of the memory.

21. The system of claim 19, wherein the pointer further comprises a memory corruption detection protected space value, and the memory management unit is to perform a validation check of the memory corruption detection value in the pointer with the memory corruption detection value in the memory for the block when the memory corruption detection protected space value is within the memory corruption detection protected space for the subset of the memory.

22. The system of claim 17, further comprising a register to store a base address of a memory corruption detection table in the memory comprising the memory corruption detection value for the block.

23. The system of claim 17, wherein the position of the memory corruption detection value in the pointer in the location does not include a least significant bit of the pointer.

24. The system of claim 17, wherein the pointer comprises a linear address of the block of the memory.

* * * * *